(12) United States Patent
Sahlin et al.

(10) Patent No.: US 10,201,018 B2
(45) Date of Patent: Feb. 5, 2019

(54) TRANSMISSION AND RECEPTION OF A RANDOM ACCESS PREAMBLE SIGNAL

(71) Applicant: Telefonaktiebolaget LM Ericsson (publ), Stockholm (SE)

(72) Inventors: Henrik Sahlin, Mölnlycke (SE); Håkan Andersson, Linköping (SE); Mattias Frenne, Uppsala (SE); Johan Furuskog, Stockholm (SE); Peter Nauclér, Knivsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 26 days.

(21) Appl. No.: 15/125,652

(22) PCT Filed: Jun. 13, 2014

(86) PCT No.: PCT/EP2014/062383
§ 371 (c)(1),
(2) Date: Sep. 13, 2016

(87) PCT Pub. No.: WO2011/144256
PCT Pub. Date: Oct. 1, 2015

(65) Prior Publication Data
US 2017/0006638 A1    Jan. 5, 2017

Related U.S. Application Data

(60) Provisional application No. 61/969,912, filed on Mar. 25, 2014.

(51) Int. Cl.
*H04J 13/00* (2011.01)
*H04J 13/10* (2011.01)
(Continued)

(52) U.S. Cl.
CPC ..... *H04W 74/0833* (2013.01); *H04J 13/0003* (2013.01); *H04J 13/0062* (2013.01);
(Continued)

(58) Field of Classification Search
None
See application file for complete search history.

(56) References Cited

U.S. PATENT DOCUMENTS 8,340,234 B1 * 12/2012 Cheng ................ H04L 25/0212
375/348
8,743,914 B1 * 6/2014 Jensen ................... H04B 7/086
370/310
(Continued)

FOREIGN PATENT DOCUMENTS

CN    103001749 A    3/2013
CN    103384376 A    11/2013
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.3.0, Jun. 1, 2013, pp. 1-108, 3GPP, France.
(Continued)

*Primary Examiner* — Alpus Hsu
*Assistant Examiner* — Camquyen Thai
(74) *Attorney, Agent, or Firm* — Coats & Bennett, PLLC

(57) ABSTRACT

A method performed in a preamble transmitter for transmitting a preamble sequence, the method comprising the steps of generating S11 a short sequence s(n), the short sequence having the same time duration as an OFDM symbol used for carrying data traffic in a radio access network of the preamble transmitter, constructing S12 a preamble sequence by
(Continued)

concatenating a plurality of said short sequences in time, and transmitting S13 the constructed preamble sequence as a radio signal to a preamble receiver transmission and reception of a random access preamble signal.

14 Claims, 30 Drawing Sheets

(51) Int. Cl.
*H04L 27/26* (2006.01)
*H04W 74/00* (2009.01)
*H04W 74/08* (2009.01)

(52) U.S. Cl.
CPC .......... *H04J 13/107* (2013.01); *H04L 27/265* (2013.01); *H04L 27/2613* (2013.01); *H04W 74/004* (2013.01)

(56) References Cited

U.S. PATENT DOCUMENTS

| | | | | |
|---|---|---|---|---|
| 2004/0100898 | A1* | 5/2004 | Anim-Appiah | H04L 1/206 370/210 |
| 2006/0215779 | A1* | 9/2006 | Shiina | H04L 27/2665 375/260 |
| 2007/0217526 | A1* | 9/2007 | Park | H04L 25/03159 375/260 |
| 2009/0010316 | A1* | 1/2009 | Rofougaran | H01L 23/66 375/219 |
| 2009/0225908 | A1* | 9/2009 | Masuda | H04L 27/2647 375/343 |
| 2009/0232126 | A1* | 9/2009 | Cordeiro | H01Q 3/26 370/350 |
| 2010/0020905 | A1* | 1/2010 | Mansour | H04J 11/00 375/343 |
| 2010/0172423 | A1 | 7/2010 | Chrabieh et al. | |
| 2010/0309993 | A1* | 12/2010 | Hao | H04J 13/0003 375/259 |
| 2010/0311428 | A1* | 12/2010 | Zhang | H04J 13/0062 455/447 |
| 2011/0086658 | A1* | 4/2011 | Baldemair | H04J 13/0059 455/507 |
| 2011/0243040 | A1* | 10/2011 | Khan | H04B 7/0617 370/280 |
| 2012/0093200 | A1* | 4/2012 | Kyeong | H04B 1/711 375/144 |
| 2012/0250523 | A1* | 10/2012 | Miki | H04L 1/1812 370/242 |
| 2013/0045690 | A1* | 2/2013 | Seol | H04B 7/0417 455/63.4 |
| 2013/0070726 | A1 | 3/2013 | Zhang et al. | |
| 2013/0121315 | A1 | 5/2013 | Langereis et al. | |
| 2015/0056981 | A1 | 2/2015 | Song et al. | |
| 2015/0382336 | A1 | 12/2015 | Zhang et al. | |
| 2017/0006637 | A1 | 1/2017 | Sahlin et al. | |

FOREIGN PATENT DOCUMENTS

| | | |
|---|---|---|
| CN | 105636108 A | 6/2016 |
| EP | 1274193 A1 | 1/2003 |
| WO | 2005088853 A1 | 9/2005 |
| WO | 2007089199 A2 | 8/2007 |
| WO | 2007149290 A2 | 12/2007 |
| WO | 2009151358 A1 | 12/2009 |
| WO | 2014110875 A1 | 7/2014 |
| WO | 2015084225 A1 | 6/2015 |
| WO | 2015084226 A1 | 6/2015 |
| WO | 2015144208 A1 | 10/2015 |
| WO | 2015188861 A1 | 12/2015 |
| WO | 2016072886 A1 | 5/2016 |
| WO | 2016141782 A1 | 9/2016 |
| WO | 20180053748 A1 | 3/2018 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.3.0, Jun. 1, 2013, pp. 1-176, 3GPP, France.

Sesia, S. et al., "LTE. The UMTS Long Term Evolution. From Theory to Practice", Second Edition, Jan. 1, 2011, pp. 1-794, John Wiley & Sons Ltd.

Sahlin, Henrik et al., "Random Access Preamble Format for Systems with Many Antennas", Globecom Workshops, Dec. 8-12, 2014, pp. 1-6, Ericsson Research, Ericsson System and Technologies, Ericsson AB, Sweden.

\* cited by examiner

TRANSMISSION AND RECEPTION OF A RANDOM ACCESS PREAMBLE SIGNAL

TECHNICAL FIELD

The present disclosure relates to random access in wireless communication systems, and in particular to a transmitter, a receiver, and to methods for transmitting and receiving random access preamble signals.

BACKGROUND

The fourth generation, 4G, wireless access within the 3rd generation partnership project, 3GPP, long-term evolution, LTE, is based on orthogonal frequency-division multiplexing, OFDM, in downlink and discrete Fourier transform, DFT, spread OFDM, also known as single carrier frequency division multiple access, SC-FDMA, in uplink. Here, the uplink consists of the physical channels PUSCH, PUCCH, and PRACH and of the physical signals DMRS and SRS. According to the 3GPP specification, see, e.g., 3GPP TS 36.211 V11.3.0, the PUSCH, PUCCH, DMRS, and SRS all use an IFFT of size 2048 in the transmitter, with a sampling rate of 30.72 MHz. The same size of 2048 can be used for the FFT in the receiver. Dedicated hardware is commonly used for these FFTs. With another sampling rate than 30.72 MHz, the IFFT and FFT size will change accordingly.

The Physical Random-Access Channel, i.e., the PRACH, is used for initial access for a wireless device into the radio access network and also for timing offset estimation, i.e., estimation of timing offset between wireless device transmissions and reception at a base station. A description of this procedure is given in 3GPP TS 36.213 V11.3.0. An illustration 100 of PRACH, as specified for LTE, see, e.g., 3GPP TS 36.211 V11.3.0, is given in FIG. 1. Here five different formats, referred to in FIG. 1 as Format 0-Format 4, are specified where a PRACH preamble 101, 101' consists of one 101 or two 101' sequences, each of length 24 576 samples. The preambles have a cyclic prefix 102, CP, of length between 3 168 and 21 024 samples for formats 0 to 3.

Several methods have been proposed for how to detect the PRACH preambles transmitted by the UE, see e.g., S. Sesia. I. Toufik. M Baker "LTE, The UMTS Long Term Evolution, From Theory to Practice", Second Edition, John Wiley & Sons Ltd., 2011, where both a full frequency domain and a hybrid time-frequency approach are presented. In the full frequency domain approach the received signal is processed with an FFT corresponding to the length of the preamble. Hence, as shown in FIG. 2, an FFT 203 of length 24 576 is thus required for each antenna. Dedicated hardware is commonly used for this PRACH FFT. After this large FFT, the PRACH bandwidth is extracted, which is a subset of the output from this large FFT.

In the hybrid time-frequency approach, a low-pass filter is first used in the time domain in order to extract the PRACH bandwidth. This lowpass filter is followed by an FFT of a size much smaller than 24 576. However, one such low-pass filter has to be applied to each antenna signal.

Consequently, as illustrated by FIGS. 1 and 2, the PRACH preamble as specified in LTE Release 8 covers a time interval which is much longer than the length of OFDM symbols used for other transmissions such as user data symbols. Current PRACH preamble receivers are thus designed under the assumption that propagation conditions are not varying significantly during the length of the preamble. This may be problematic, since assumptions, or constraints, are placed on the communication system. These constraints include expectations on low UE speed, i.e., Doppler spread, low frequency errors and low Doppler shifts, and also low phase noise in transmitters and receivers.

Thus, there is a need for an improved PRACH signaling technique, i.e., a preamble transmitter and receiver, which does not place or otherwise imply the above mentioned constraints on the communication system.

With currently emerging technologies, such as 5G communication systems, the use of many antenna elements is of great interest. As illustrated in FIG. 3, the antenna signals can come from several antenna polarizations 304. Here, the antenna signals 305 are first received in a Radio Unit, RU, 306. The signals are then sampled and quantized in an Analog-to-Digital Converter, ADC, 307. A transformation from time to frequency domain is done using an FFT module 308, or, alternatively by a DFT module not shown in FIG. 3, after which a PRACH receiver 309 is applied to detect a preamble comprised in the received radio, i.e., antenna, signals. Here, an FFT is typically calculated for each antenna or for each subset of antennas, such that different users and channels in different sub-bands of the received signal can be extracted before further signal processing.

FIG. 3 illustrates current PRACH receivers having multiple antennas. FIG. 3 visualizes that with a large number of receiver antennas 310, the amount of FFT processing in the receiver is also large, which is generally a drawback. With dedicated antenna-signal processing only used for PRACH, a significant amount of special hardware for PRACH must be included, which hardware causes increased material cost as well as increased energy consumption. Also, running PRACH-specific antenna-signal processing consumes power and requires cooling capacity. Consequently, there is a need for a PRACH receiver better suited for multiple-antenna operation.

In order to increase received signal strength, a beamforming procedure can be used in which several antenna signals are scaled, phase shifted, and added before the PRACH receiver 309 is applied. Beamforming aims at combining received signals from several antennas such that more signal energy is received in specific spatial directions. Several beams can be formed in order to beamform towards different spatial directions. With two polarizations, the antenna signals from each polarization are typically beamformed separately. The same, or different, beamforming can be applied to the different polarizations.

This beamforming 411 can be done in the frequency domain, i.e., after the FFT 408, as illustrated in FIG. 4. After the FFT 408, the individual sub-carriers can be extracted such that different physical channels and signals can be extracted. With digital beamforming 411 in the frequency domain, the antenna signals are first processed with an FFT 408 and then beamformed 411. In this manner, different sub-carriers can be beamformed differently. This allows for different beamforming for different physical channels and signals. Also, if several UEs are multiplexed in frequency, then these can be processed with individual beamforming.

However, with digital beamforming, a specific PRACH FFT has to be calculated for each receiver antenna, before extracting the PRACH bandwidth and beamforming into a smaller amount of signals. This is potentially a drawback due to the added signal processing required.

Alternatively, the beamforming can be done in the time domain 511b, as shown in FIG. 5. Here, the beamforming is done on a digital signal, i.e., after analog-to-digital conversion by the ADC 507. However, since the FFT 508 is calculated after the beamforming 511b, all sub-carriers are beamformed in the same spatial direction, which is a potential drawback in some scenarios, e.g., where UEs are spread out over a large area.

An alternative time-domain beamforming 611c is illustrated in FIG. 6, where the beamforming 611c is done before ADC 607. Here, the beamforming is done on an analog signal, i.e., before analog-to-digital conversion by the ADC 607.

Combinations of analog and digital beamforming and time- and frequency-domain beamforming are also possible.

With analog beamforming, such as the beamforming illustrated in FIG. 6, the number of spatial directions for PRACH is limited by the number of analog beamformers. In LTE release 8, the PRACH preamble, and thus also the PRACH FFT, spans almost a whole sub-frame. The analog beamforming must therefore be fixed during a whole sub-frame which limits the number of beamforming directions.

Hence, present solutions for receiving PRACH and performing UE initial access and timing offset estimation are costly in terms of extra hardware and design effort, as well as in increased energy consumption and signal processing resources. Furthermore, improvements in the interworking between PRACH reception and beamforming in multiple antenna systems are preferred in order to reduce complexity of implementation.

It is an object of the present disclosure to provide solutions to, or at least mitigate, the above mentioned deficiencies in the art.

SUMMARY

An object of the present disclosure is to provide at least a transmitter, a receiver, and methods for transmitting and receiving random access preamble signals, which seeks to mitigate, alleviate, or eliminate one or more of the above-identified deficiencies in the art and disadvantages singly or in any combination.

This object is obtained by a preamble transmitter comprising:
- a short sequence generator arranged to generate a short sequence s(n), and
- a preamble sequence generator adapted to construct a preamble sequence by concatenating a plurality of said short sequences in time, as well as
- a transmitter unit arranged to transmit the generated preamble sequence as a radio signal.

The short sequence s(n) has the same time duration as an OFDM symbol used for carrying data traffic in a radio access network of the preamble transmitter.

Thus, by the present technique, there is no need for a special FFT used for receiving preambles in an uplink receiver of the transmitted radio signal.

According to an aspect, the preamble transmitter is further arranged to transmit the preamble sequence over a Physical Random Access Channel, PRACH, of a radio access network.

Thus, by the present technique, there is no need for a special PRACH FFT in the uplink receiver of the transmitted radio signal.

The object is also obtained by a preamble receiver arranged to receive radio signals comprising a preamble sequence. The preamble receiver comprises:
- at least one antenna element and corresponding radio unit configured to receive a radio signal, and
- at least one analog to digital converter, ADC, configured to perform analog to digital conversion of the received radio signal, as well as
- at least one FFT module arranged to determine a Fast Fourier Transform of the analog to digital converted signal, and also
- at least one detector adapted to detect the preamble sequence based on the determined FFT.

The preamble sequence comprises a concatenation in time of a plurality of short sequences s(n), where each such short sequence s(n) has the same time duration as an OFDM symbol used for carrying data traffic in a radio access network of the preamble receiver. Also, the size of the FFT used for detecting the preamble signal is of the same size as one used for detecting an OFDM symbol carrying data traffic in a radio access network.

Thus, by the present technique, there is no need for a special FFT used for receiving preambles in the uplink receiver. This is especially important if FFT operations are performed for a large number of receiver antennas, as will become apparent from the present disclosure.

According to an aspect, the preamble receiver is further arranged to use one FFT hardware resource and FFT configuration both for detecting OFDM symbols carrying data, and also for detecting preamble sequences.

Thus, by the present technique, there is no special PRACH FFT in the preamble receiver.

According to one aspect, the preamble receiver comprises a preamble detector arranged to determine a plurality of FFTs from a plurality of FFT windows, and to non-coherently combine the FFT results into a combined received preamble signal.

According to another aspect, the preamble receiver comprises a preamble detector arranged to determine a plurality of FFTs from a plurality of FFT windows, and to coherently combine the FFT results into a combined received preamble signal.

Thus, by the feature of the preamble detector arranged to determine a plurality of FFTs from a plurality of FFT windows, and to coherently combine FFT results, there is provided a preamble receiver which is robust to high UE speeds, i.e., large Doppler spreads, and also to large frequency errors and high phase noise.

According to an aspect, the preamble receiver is arranged for beamforming. The beamforming weights are configured to change between FFT windows such that the number of spatial directions for which preamble detection is done is increased.

According to an aspect, the preamble receiver comprises hardware support for more than one simultaneous analog beamforming configuration, the preamble receiver being adapted for switching at a first switching rate between spatial directions with one beamforming configuration, and for switching at a second switching rate between spatial directions with another beamforming configuration, the first rate being different from the second rate.

Consequently, there is herein provided support for an increased number of beamforming directions if switching beamforming between FFT windows.

There is also provided herein a combined fast beamforming switching and slow beamforming switching. This means that both UEs with high and low SNR can be detected, albeit the latter with a larger delay.

According to an aspect, a single IFFT is applied per beam direction and polarization.

According to an aspect, the preamble receiver is arranged to perform simultaneous beam-forming and matched filtering by a comprised joint filter.

Thus, the present technique provides for low computational complexity in the receiver, since coherent accumulation of the matched filter outputs from different FFT windows is possible There is furthermore provided a technique which enables using only one IFFT per beam direction and polarization in a beamforming system, as well as simultaneous beamforming and matched filtering.

There is also disclosed a preamble transmitter and receiver system, comprising at least one preamble transmitter and at least one preamble receiver as disclosed herein.

The object is also obtained by a network node comprising the preamble receiver according to any of the aspects disclosed herein.

The object is further obtained by a method performed in a preamble transmitter for transmitting a preamble sequence. The method comprises the steps of
  generating a short sequence s(n), the short sequence having the same time duration as an OFDM symbol used for carrying data traffic in a radio access network of the preamble transmitter,
  constructing a preamble sequence by concatenating a plurality of said short sequences in time, and
  transmitting the constructed preamble sequence as a radio signal to a preamble receiver.

The object is additionally obtained by a method performed in a preamble receiver for receiving a radio signal and detecting a preamble sequence comprised in the radio signal. The method comprises the steps of
  receiving a radio signal comprising a preamble signal constructed from a plurality of short sequences s(n) via at least one antenna element and radio unit, the short sequence s(n) having the same time duration as an OFDM symbol used for carrying data traffic in a radio access network of the preamble transmitter,
  performing analog to digital conversion of the radio signal by an ADC comprised in the preamble receiver, and
  determining a Fast Fourier Transform, FFT, of the analog to digital converted signal, wherein the size of the FFT used for detecting the preamble signal is of the same size as for detecting an OFDM symbol used for carrying data traffic in a radio access network, as well as
  detecting the preamble sequence based on the determined FFT.

According to an aspect, the step of determining an FFT further comprises determining an FFT having a single configuration for detecting OFDM symbols carrying data, and also for detecting preamble sequences.

According to an aspect, the step of detecting comprises determining a plurality of FFTs from a plurality of FFT windows, and also non-coherently combining the FFT results into a combined received preamble signal.

According to an aspect, the step of detecting comprises determining a plurality of FFTs from a plurality of FFT windows, and also coherently combining the FFT results into a combined received preamble signal.

There is also provided a computer program comprising computer program code which, when executed in a preamble transmitter, causes the preamble transmitter to execute a method according to aspects disclosed herein.

There is further provided a computer program comprising computer program code which, when executed in a preamble receiver, causes the preamble receiver to execute a method according to aspects disclosed herein.

The computer programs and the methods display advantages corresponding to the advantages already described in relation to the preamble transmitter and receiver.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
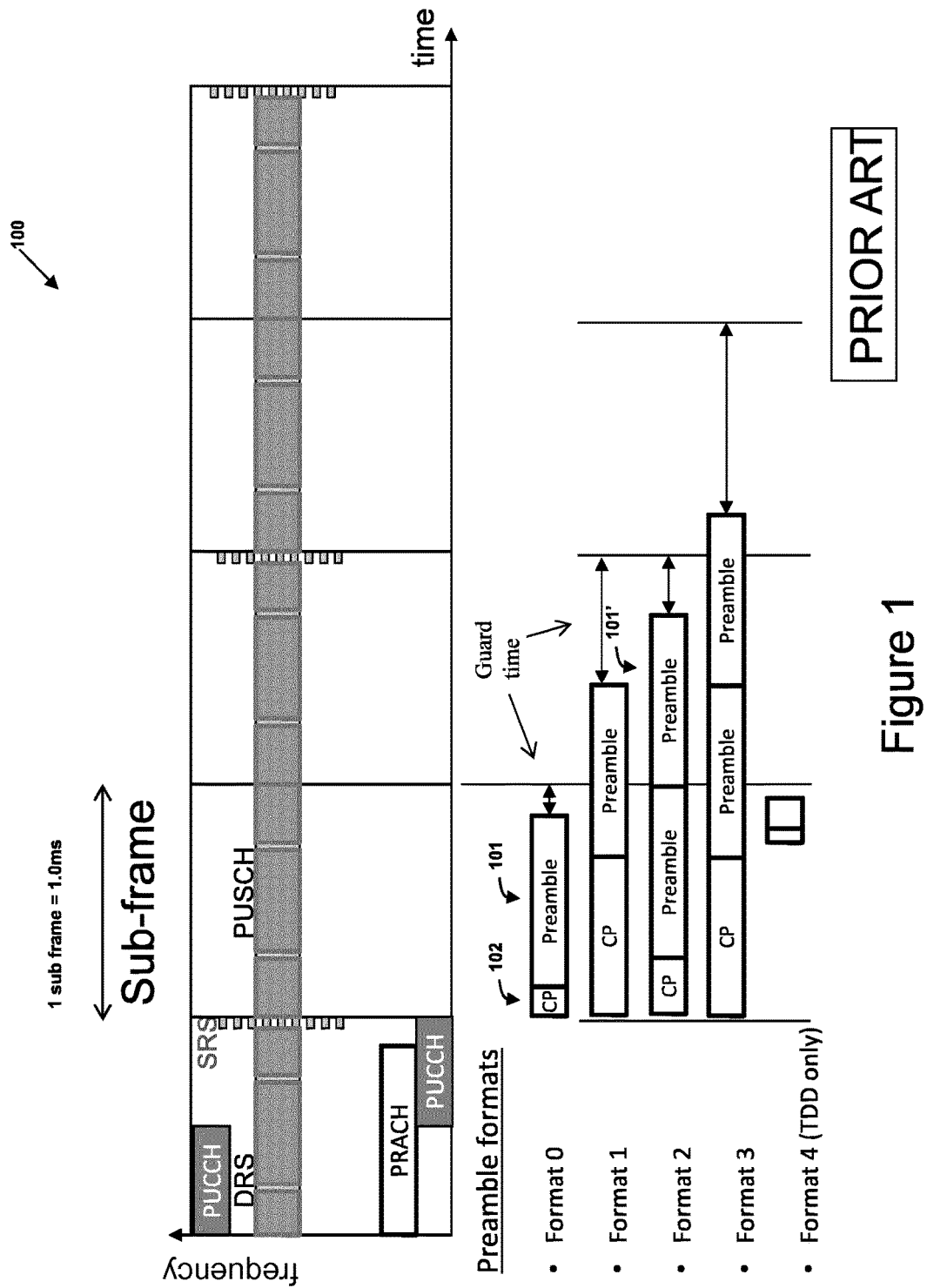
FIGS. 1-2 are signaling diagrams illustrating exchange of signals in embodiments of a network according to prior art.
Figure 2:
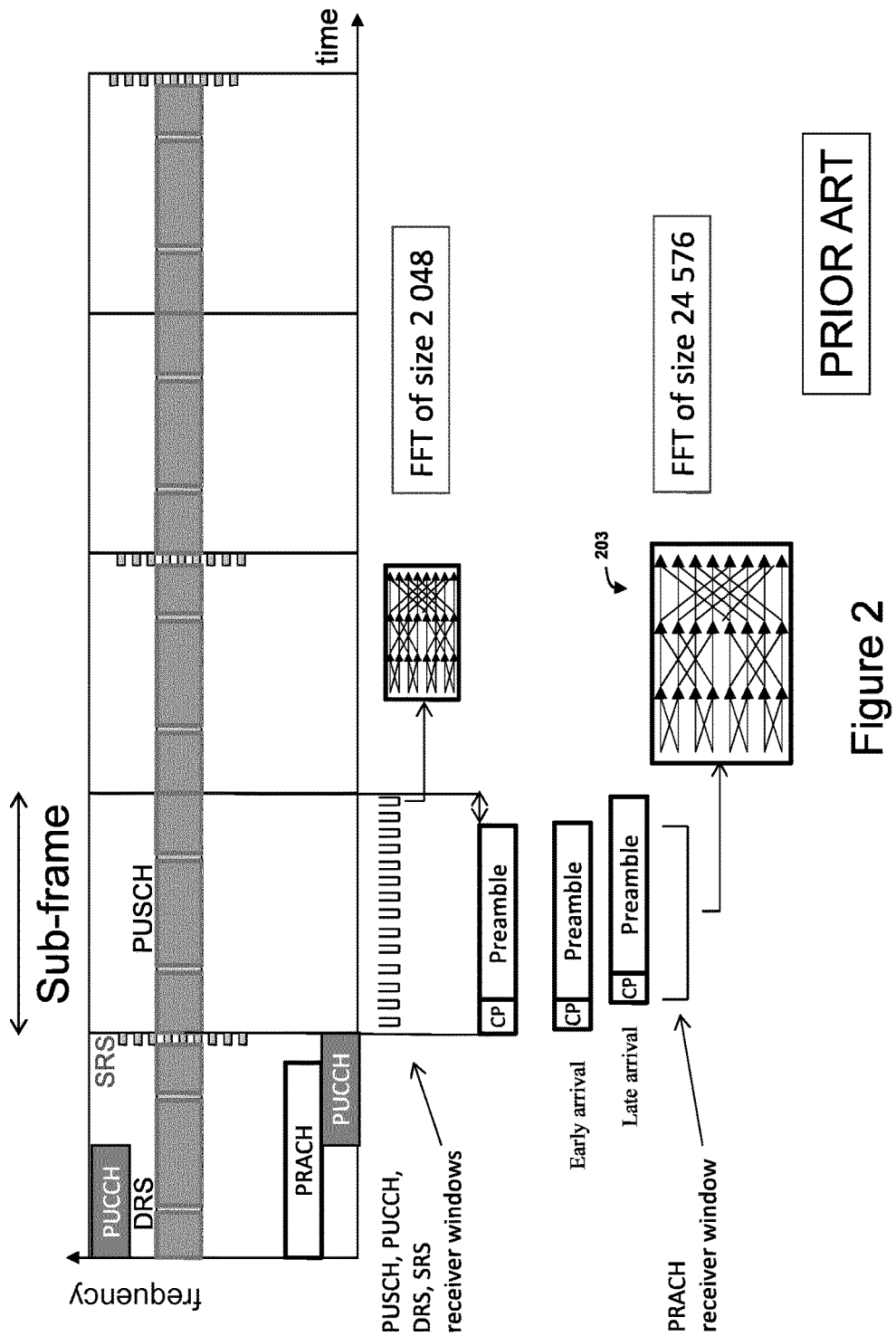
Figure 3:
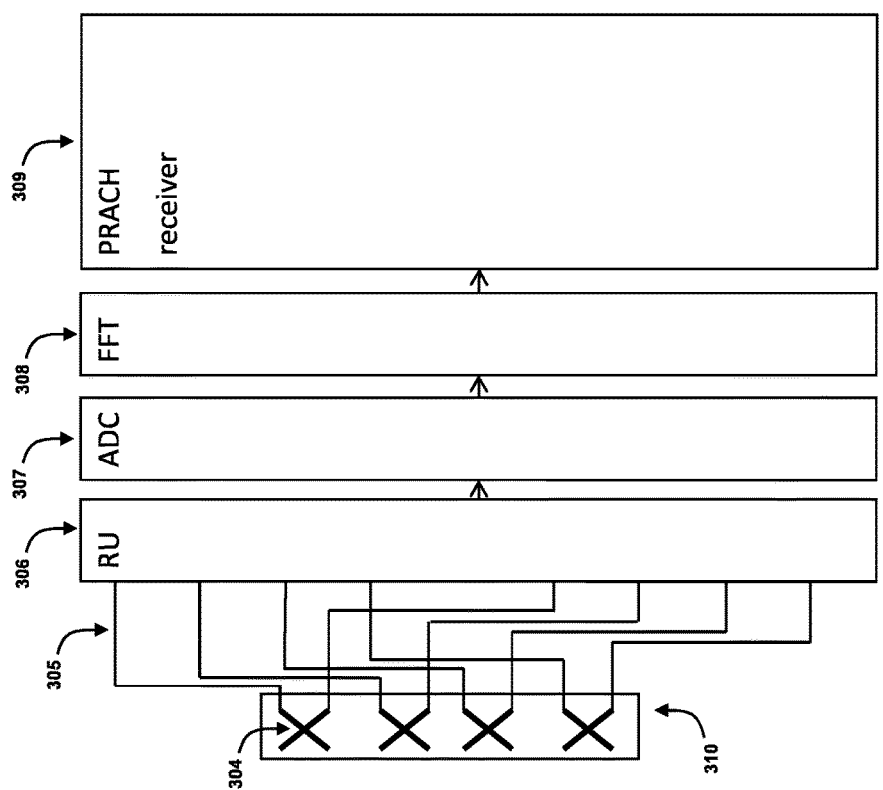
FIGS. 3-6 are block diagrams illustrating embodiments of a receiver system according to prior art.
Figure 4:
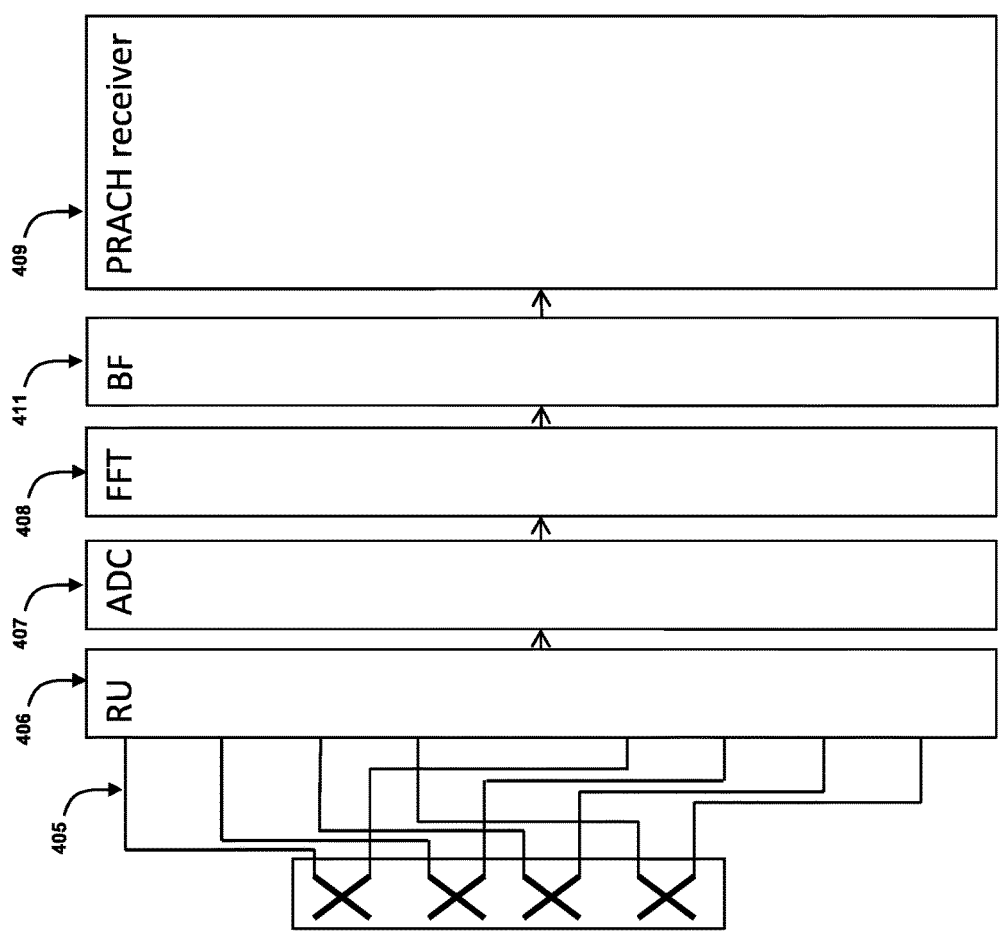
Figure 5:
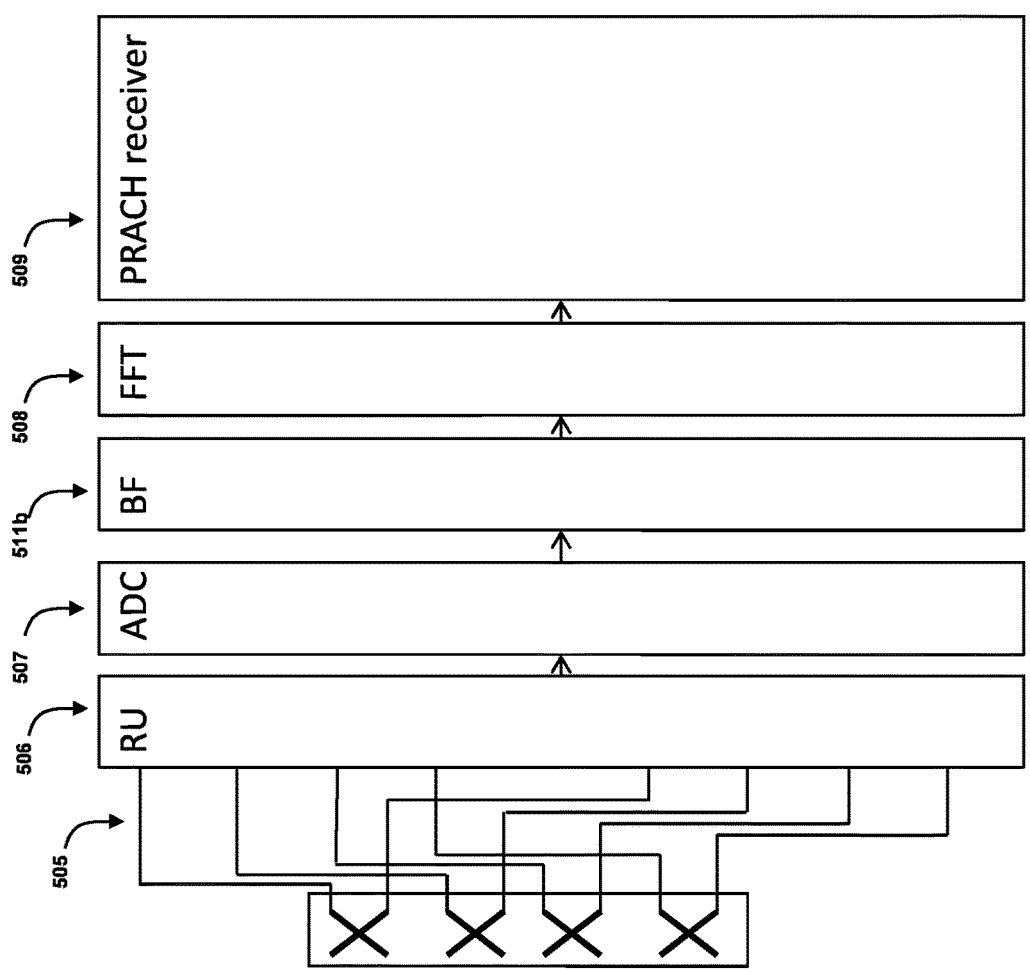
Figure 6:
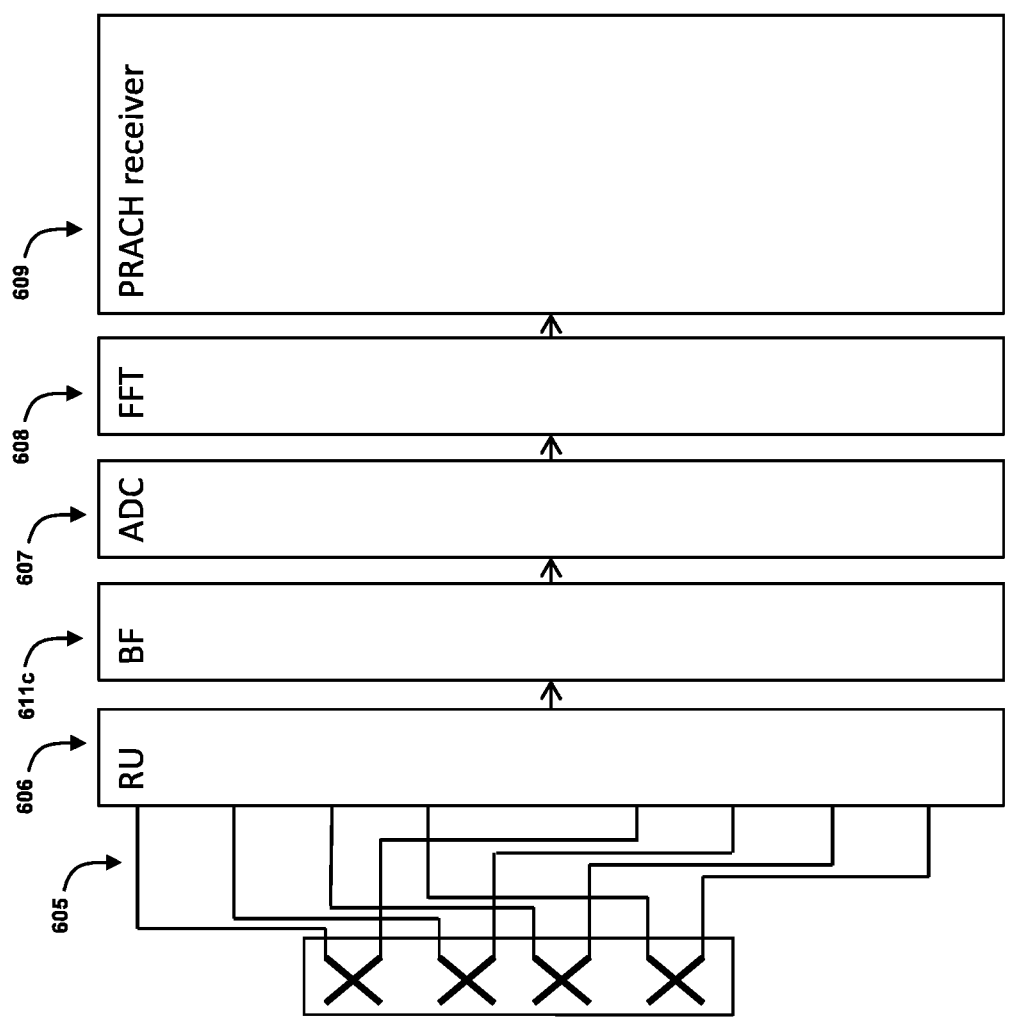

Aspects of the present disclosure will be described more fully hereinafter with reference to the accompanying drawings. The apparatus, computer program and methods disclosed herein can, however, be realized in many different forms and should not be construed as being limited to the aspects set forth herein. Like numbers in the drawings refer to like elements throughout, except for prefix digits in the number which represent the figure in which the element is to be found.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.
Abbreviations
  3GPP 3rd Generation Partnership Project
  4G Fourth Generation
  5G Fifth Generation
  ADC Analog-to-Digital Converter
  BF Beam forming
  DFT Discrete Fourier Transform
  DL Downlink
  DM-RS Demodulation reference signal
  FDD Frequency Division Duplex
  FFT Fast Fourier Transform
  IDFT Inverse Discrete Fourier Transform
  IFFT Inverse Fast Fourier Transform
  LTE Long Term Evolution
  MF Matched Filter
  OFDM Orthogonal frequency-division multiplexing
  PBCH Physical broadcast channel
  PRACH Physical random access channel
  PRB Physical Resource Block
  PSS Primary Synchronization Signal
  PUCCH Physical uplink control channel PUSCH Physical uplink shared channel
RB Resource Block
RBS Radio Base Station
RU Radio Unit
SC Sub-Carrier
SC-FDMA Single Carrier-Frequency Division Multiple Access
SNR Signal to Noise Ratio
SRS Sounding Reference Signal
SSS Secondary Synchronization Signal
TDD Time Division Duplex
UE User Equipment
UL Uplink
ZC Zadoff-Chu A preamble receiver, e.g., for receiving signals on the PRACH, is proposed herein in which FFTs of the same size as for other uplink channels and signals are used. The preamble receiver discussed herein constitutes part of a receiver in a wireless communication system, such as an LTE or 5G RBS.

In other words, the preamble receiver 2741, 1548 disclosed herein is arranged to use one FFT hardware resource and FFT configuration both for detecting OFDM symbols carrying data, and also for detecting preamble sequences.

The preamble sequence discussed herein can be used for a variety of purposes, including but not limited to initial access, handover, scheduling requests, and resynchronization.

The PRACH preamble used is based on several concatenated short sequences, where each short sequence has the same length as the length of the OFDM symbols used for all other physical channels. The preamble sequence is constructed by repeating the short sequence a number of times to make the preamble sequence. Consequently, the short sequence used to construct the preamble sequence works as a cyclic prefix to its neighbors, as will be further detailed below.

Further, in the preamble detector proposed herein, several received signals from different FFT windows can be combined. Different combinations of these FFT windows are proposed depending of the amount of phase noise, frequency errors, and UE speed.

The proposed technique is applicable in multi-antenna systems implementing beamforming. For analog beamforming systems, the beamforming weights are, according to an aspect, changed between each FFT window such that the number of spatial directions is increased for which preamble detection is done. With hardware support from more than one simultaneous analog beamforming resource, then one beamforming resource can be used for fast switching between spatial directions while the other can have a slow switching rate allowing more accumulated preamble energy in each direction.

Thus, by the present technique, no special PRACH FFT is necessary in the uplink receiver. This is especially important if FFT operations are performed for a large number of receiver antennas, due to the significant savings in, e.g., hardware processing resources.

Furthermore, the present technique facilitates receiver implementations with reduced computational complexity compared to current PRACH receiver systems. For instance,
  Coherent accumulation of matched filter outputs from different FFT windows is possible,
  There is only one IFFT per beam direction and polarization in a system with beamforming,
  It is possible to perform simultaneous beam-forming and matched filtering by a joint filter structure.

Another potential benefit of the present teaching is that a preamble detector is provided which is robust towards high UE speed, i.e. Doppler spread, large frequency errors, i.e., large Doppler shifts, and severe phase noise.

Yet another potential advantage of the present technique is an increased number of beamforming directions for analog beamforming if switching beamforming between FFT windows, which is especially beneficial for UEs with high SNR, e.g., those close to the eNodeB.

Additionally, there is provided combined fast beamforming switching and slow beamforming switching, wherein both UEs with high and low SNR can be detected, albeit the latter with a larger delay.

Figure 7:
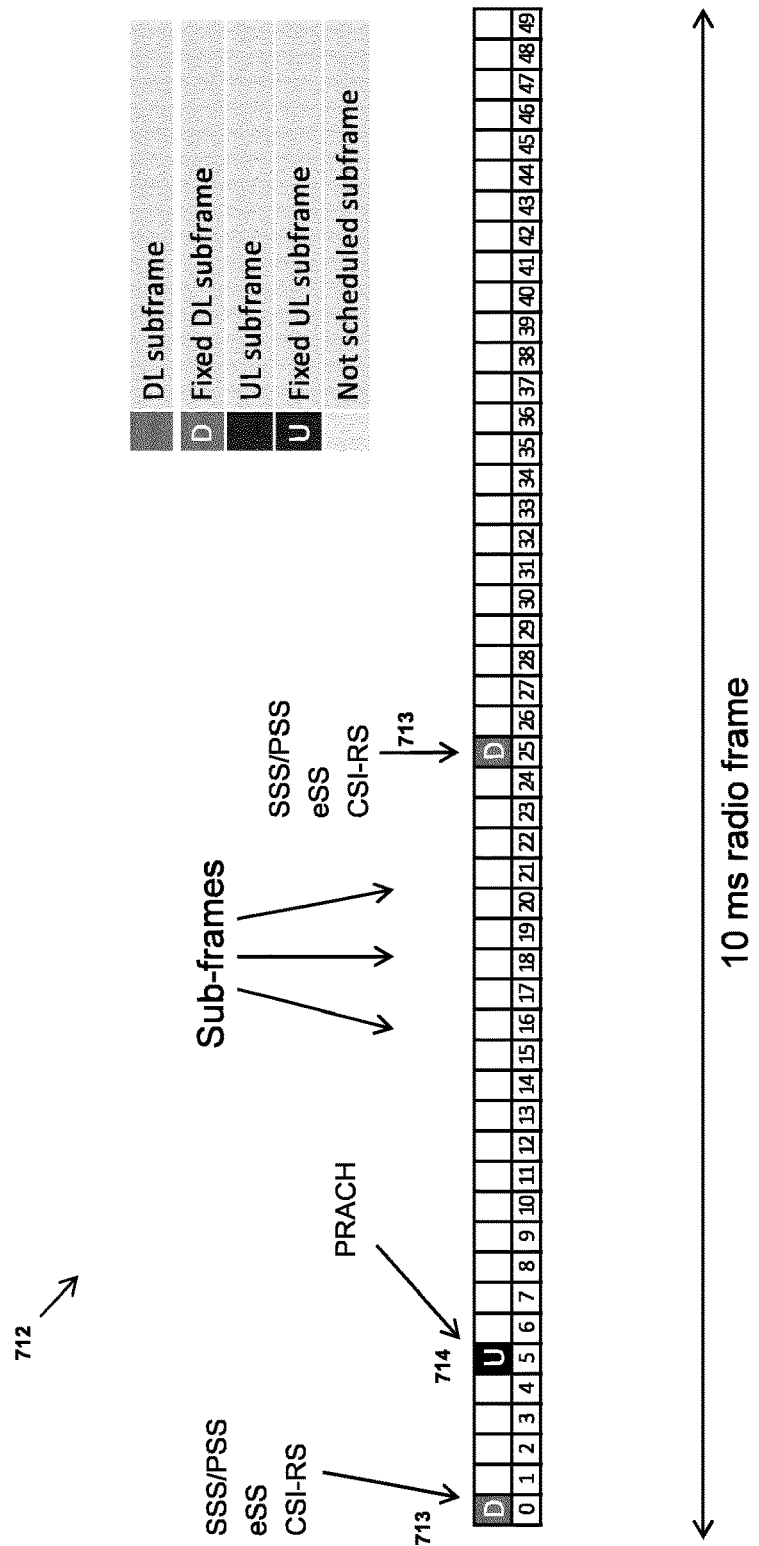
FIG. 7 is a signaling diagram illustrating exchange of signals in an embodiment of a network.

FIG. 7 shows a signaling diagram 712 illustrating timing in a communication system implementing Time Division Duplex, TDD.

In a TDD system, the same frequency is used both for downlink and uplink. Both the UE and the eNodeB must then switch between transmitting and receiving, assuming that full duplex operation is not possible.

The present teaching is focused on a TDD mode of operation. However, the technique disclosed herein also directly applies to FDD (Frequency-Division Duplex) systems. For FDD systems the problem descriptions related to switch time between transmission and receptions do not apply.

A dynamic TDD system is according to aspects configured with a few sub-frames 713 that are fixed for downlink, i.e., they cannot be used for uplink, see illustration in FIG. 7. These sub-frames are used, e.g., for transmitting synchronization signals and broadcasting control messages used for initial downlink synchronization, continuous downlink synchronization, and call setup. A dynamic TDD system can also be configured with fixed uplink sub-frames 714. Such sub-frames can, e.g., be used for PRACH to support initial access and uplink synchronization. Note that FIG. 7 is based on a radio-frame of length 10 ms, which is divided into 50 sub-frames, each of length 0.2 ms. This is in contrast to LTE Release 8 where a radio-frame is split into 10 sub-frames, each of length 1 ms.

Thus, according to an aspect, there is disclosed a method for receiving the type of preamble sequence disclosed herein in connection to the preamble transmitter, which method is not necessarily limited to a specific radio frame length or sub-frame division.

Figure 8B:
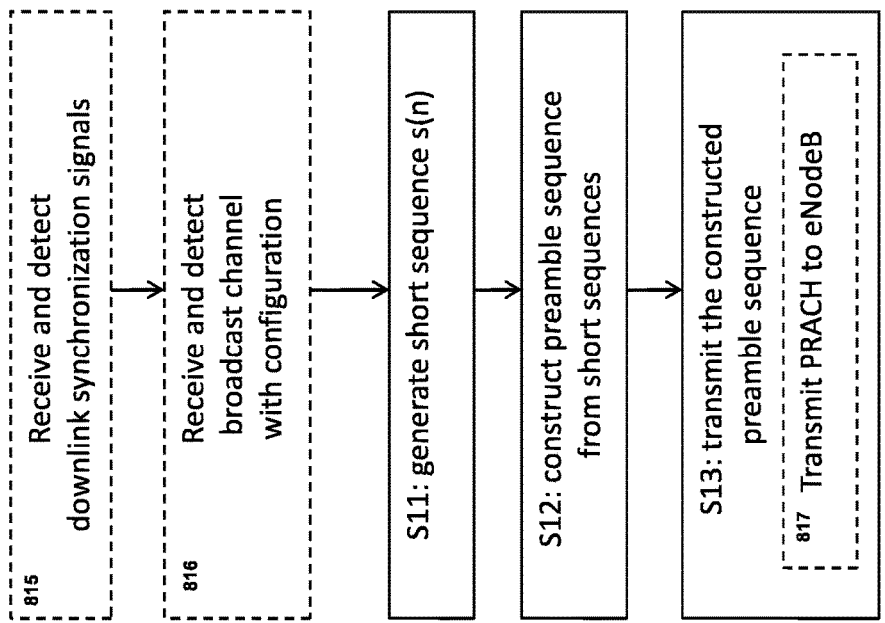
FIG. 8 is a flowchart illustrating embodiments of method steps performed in a preamble transmitter.
Figure 8A:
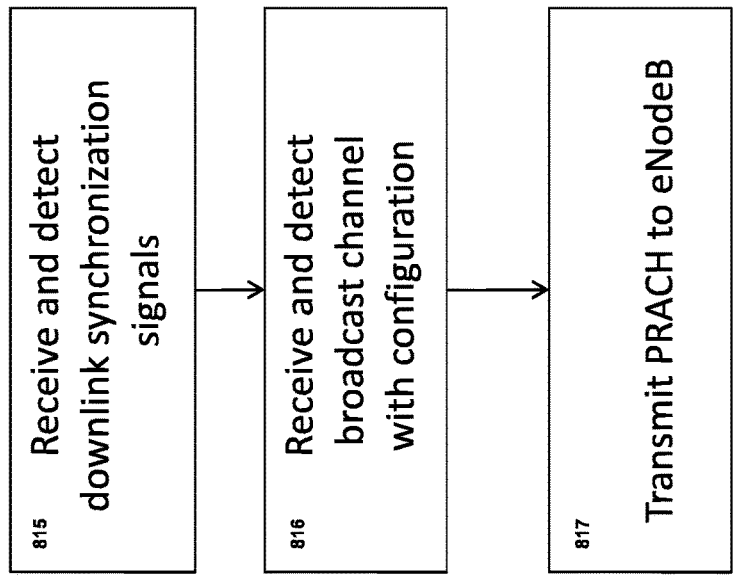

FIG. 8a shows a flow chart illustrating a procedure for initial set-up of a UE in a radio access network, where PSS and SSS are transmitted in subframe 0 and 25 in a dynamic TDD system.

FIG. 8b shows a flow chart where the steps in FIG. 8a have been put into one example context, further discussed in connection to FIG. 28 below.

The methods illustrated in FIGS. 8a and 8b are arranged to be performed by a preamble transmitter 2636 which will be further discussed in connection to FIG. 26 below. This preamble transmitter comprises:
  a short sequence generator 2650 arranged to generate a short sequence s(n), and
  a preamble sequence generator 2637 adapted to construct a preamble sequence by concatenating a plurality of said short sequences in time, as well as
  a transmitter unit 2639a,b arranged to transmit the generated preamble sequence as a radio signal.

The short sequence s(n) has the same time duration as an OFDM symbol used for carrying data traffic in a radio access network of the preamble transmitter 2636.

Figure 28:
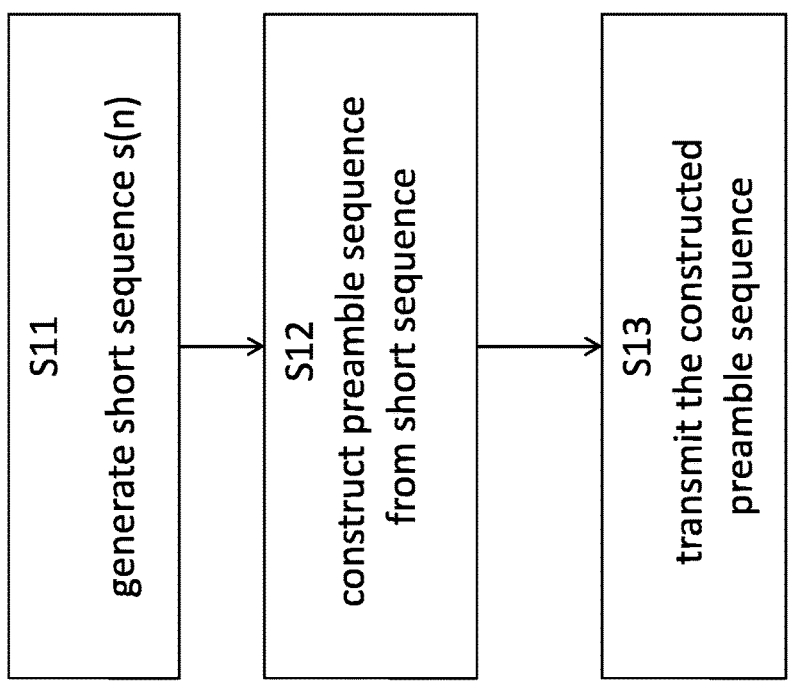
FIGS. 28-30 are flowcharts illustrating embodiments of method steps.

Turning now to FIG. 28, which illustrates a method performed in a preamble transmitter 2636 for transmitting a preamble sequence, the method comprising the steps of

- generating S11 a short sequence s(n), the short sequence having the same time duration as an OFDM symbol used for carrying data traffic in a radio access network of the preamble transmitter 2636,
- constructing S12 a preamble sequence by concatenating a plurality of said short sequences in time, and
- transmitting S13 the constructed preamble sequence as a radio signal to a preamble receiver.

Thus, at initial setup, a UE starts by receiving and synchronizing to downlink synchronization signals 815. As an example, in LTE, the UE starts by detecting the PSS, or Primary Synchronization Signal, after which the UE will attain a sub-frame synchronization, OFDM symbol synchronization, and know the cell identity, cell ID, group. Then the UE detects SSS, or Secondary Synchronization Signal, after which the UE is frame synchronized and knows the cell ID.

Figure 9:
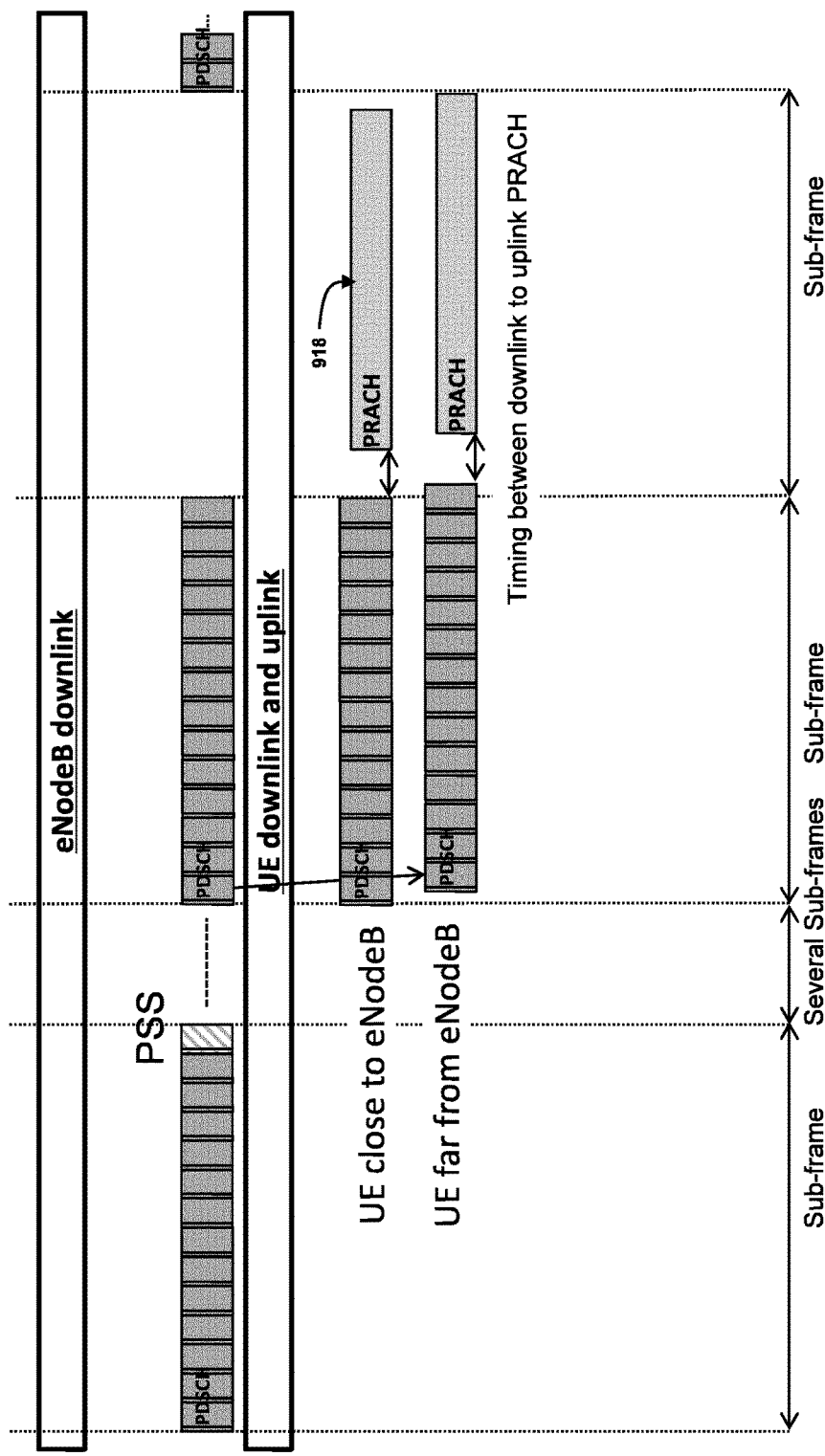
FIG. 9 is a signaling diagram illustrating exchange of signals in an embodiment of a network.

The UE, i.e., the preamble or PRACH transmitter, is then according to some aspects configured by receiving and detecting system information 816 carried by a broadcast signal. In LTE, this broadcast information is carried by PBCH, or Physical Broadcast Channel. This broadcast information can relate to time and frequency allocation of PRACH, such that the UE knows when and where it is allowed to transmit PRACH preambles. This is further illustrated in FIG. 9, where the UE can transmit PRACH 918 in sub-frame 5, which in this TDD system is a fixed allocation to uplink transmissions. Also, the UE can be configured by broadcast information or preconfigured with timing information of when within a sub-frame it may transmit the preamble.

Based on broadcast information, or preconfigured in the UE according to specification, a PRACH preamble signal is constructed in the UE and transmitted 817.

Figure 10B:
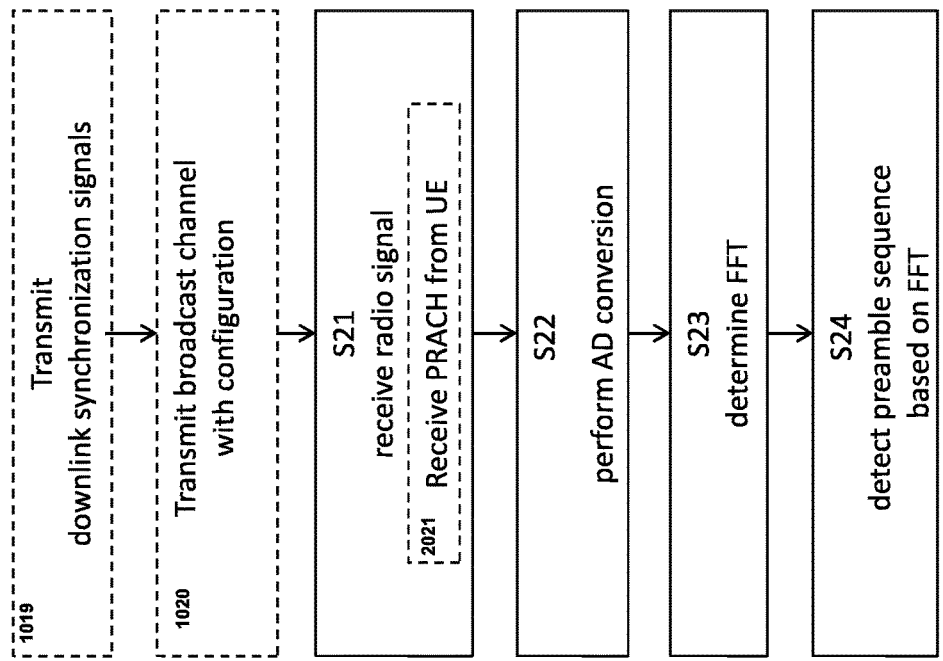
FIG. 10 is a flowchart illustrating embodiments of method steps performed in a preamble receiver.
Figure 10A:
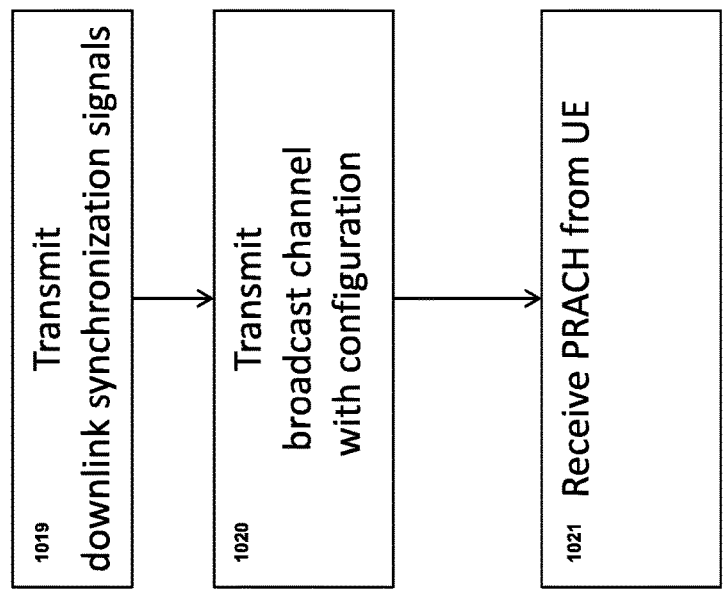

A corresponding illustration for an eNodeB, i.e., the preamble or PRACH receiver, is given in FIG. 10a.

FIG. 10b shows a flowchart where the steps in FIG. 10a have been put into one example context, further discussed in connection to FIG. 29 below.

The methods illustrated in FIGS. 10a and 10b are arranged to be performed by a preamble receiver 2741, 1447 which will be further discussed in connection to FIGS. 14 and 27 below. This preamble receiver comprises:

- at least one antenna element 1410 and corresponding radio unit 1406, configured to receive a radio signal, and
- at least one analog to digital converter, ADC, 1407 configured to perform analog to digital conversion of the received radio signal, as well as
- at least one FFT module 1408 arranged to determine a Fast Fourier Transform, of the analog to digital converted signal, and also
- at least one detector 1428 adapted to detect the preamble sequence based on the determined FFT.

Figure 29:
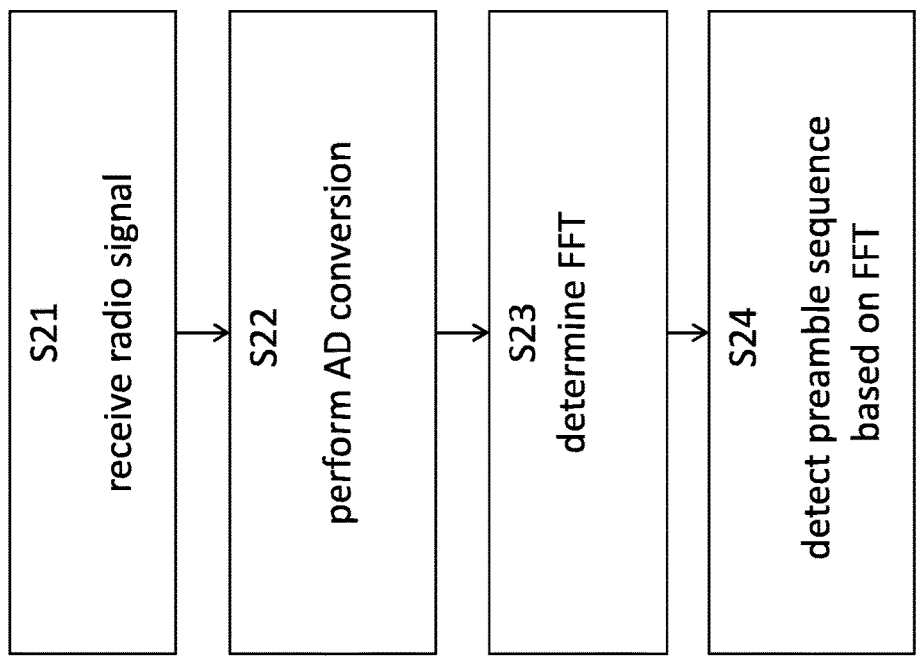

Turning now to FIG. 29, which illustrates a method performed in a preamble receiver 2741, 1447 for receiving a radio signal and detecting a preamble sequence comprised in the radio signal, the method comprising the steps of

- receiving S21 a radio signal comprising a preamble signal constructed from a plurality of short sequences s(n) via at least one antenna element 1410 and radio unit 1406, the short sequence s(n having the same time duration as an OFDM symbol used for carrying data traffic in a radio access network of the preamble transmitter 2636,
- performing S22 analog to digital conversion of the radio signal by an ADC 1407 comprised in the preamble receiver, and
- determining S23 a Fast Fourier Transform, FFT, 1408 of the analog to digital converted signal, wherein the size of the FFT used for detecting the preamble signal is of the same size as for detecting an OFDM symbol used for carrying data traffic in a radio access network, as well as
- detecting S24 the preamble sequence based on the determined FFT.

Thus, the received preamble sequence comprises a concatenation in time of a plurality of short sequences s(n). Each such short sequence s(n) has the same time duration as an OFDM symbol used for carrying data traffic in a radio access network of the preamble receiver 2741, 1447. Thus, the size of the FFT used for detecting the preamble signal is preferably of the same size as one used for detecting an OFDM symbol carrying data traffic in a radio access network.

Preamble Construction in UE

Turning now to the details of how a preamble is constructed in the UE, i.e., in the preamble transmitter disclosed herein.

Figure 26:
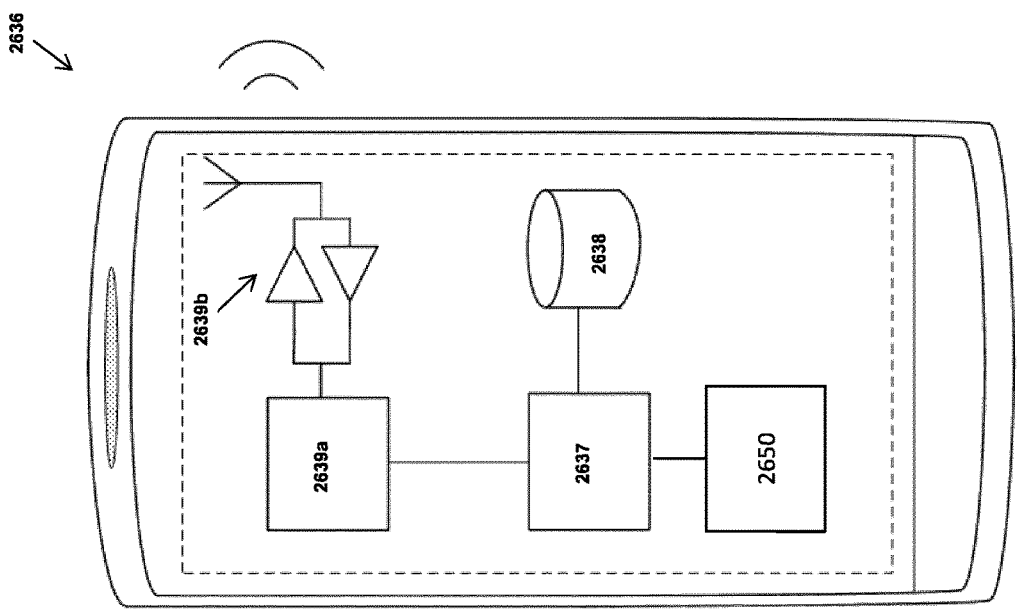
FIG. 26 is a block diagram illustrating embodiments of a transmitter system.

An example embodiment of a preamble transmitter 2636 arranged to perform the steps disclosed below is shown in FIG. 26.

The preamble sequence depends on the PRACH frequency allocation, such that the number of sub-carriers, $N_{seq}$, allocated for PRACH equals the maximum number of symbols. For example, with LTE nomenclature, 6 resource blocks are allocated to PRACH, which correspond to 72 sub-carriers.

A short sequence can, e.g., be constructed by using Zadoff-Chu sequences. The u:th root Zadoff-Chu sequence is defined in 3GPP TS 36.211 V11.3.0 as $$x_u(n) = e^{-j\frac{\pi u n(n+1)}{N_{ZC}}}, \quad 0 \leq n \leq N_{ZC} - 1 \tag{1}$$

where the length $N_{ZC}$ of the Zadoff-Chu sequence is a prime number. For a PRACH allocation of 72 sub-carriers, the sequence length can, e.g., be set to 71.

Thus, the short sequence, at times referred to herein as s(n), comprises a Zadoff-Chu sequence.

A time-continuous short random-access signal s(t) is defined by $$s_{short}(t) = \beta_{PRACH} \sum_{k=0}^{N_{seq}-1} \sum_{n=0}^{N_{seq}-1} x_u(n) \cdot e^{-j\frac{2\pi nk}{N_{seq}}} \cdot e^{j2\pi(k+k_0)\Delta f t} \tag{2}$$

where $0 \leq t < T_{short}$, $N_{seq}=71$, $\beta_{PRACH}$ is an amplitude-scaling factor in order to conform to the transmit power of PRACH, $k_0 = n_{PRB}^{RA} N_{sc}^{RB} - N_{RB}^{UL} N_{sc}^{RB}/2$, and $\Delta f$ is the sub-carrier spacing. The location in the frequency domain is controlled by the parameter $n_{PRB}^{RA}$; the resource block size in the frequency domain, expressed as a number of subcarriers, is denoted by $N_{sc}^{RB}$, and the uplink bandwidth configuration, expressed in multiples of $N_{sc}^{RB}$, is denoted by $N_{RB}^{UL}$. Using a Zadoff-Chu sequences implies that $N_{seq}=N_{ZC}$.

A short sequence of the same length as the OFDM symbol is achieved by $T_{short}=1/\Delta f$. For LTE Release 8, this subcarrier spacing equals Δf=15 kHz, see Table 6.2.3-1 in 3GPP 36.211 V11.3.0, such that the length of the short sequence equals $T_{short}$=66.6 μs. With a change in subcarrier spacing to, e.g., Δf=75 kHz, then the length of the short symbol equals $T_{short}$=13.3 μs.

Thus, the short sequence s(n) has the same time duration as an OFDM symbol used for carrying data traffic in a radio access network of the preamble transmitter 2636.

The preamble to be transmitted is constructed by $$s(t)=s_{short}((t-T_{CP}) \bmod(T_{short})) \quad (3)$$

where $0 \le t < T_{SEQ}$, and $T_{CP}$ is the length of a possible cyclic prefix.

Figure 11:
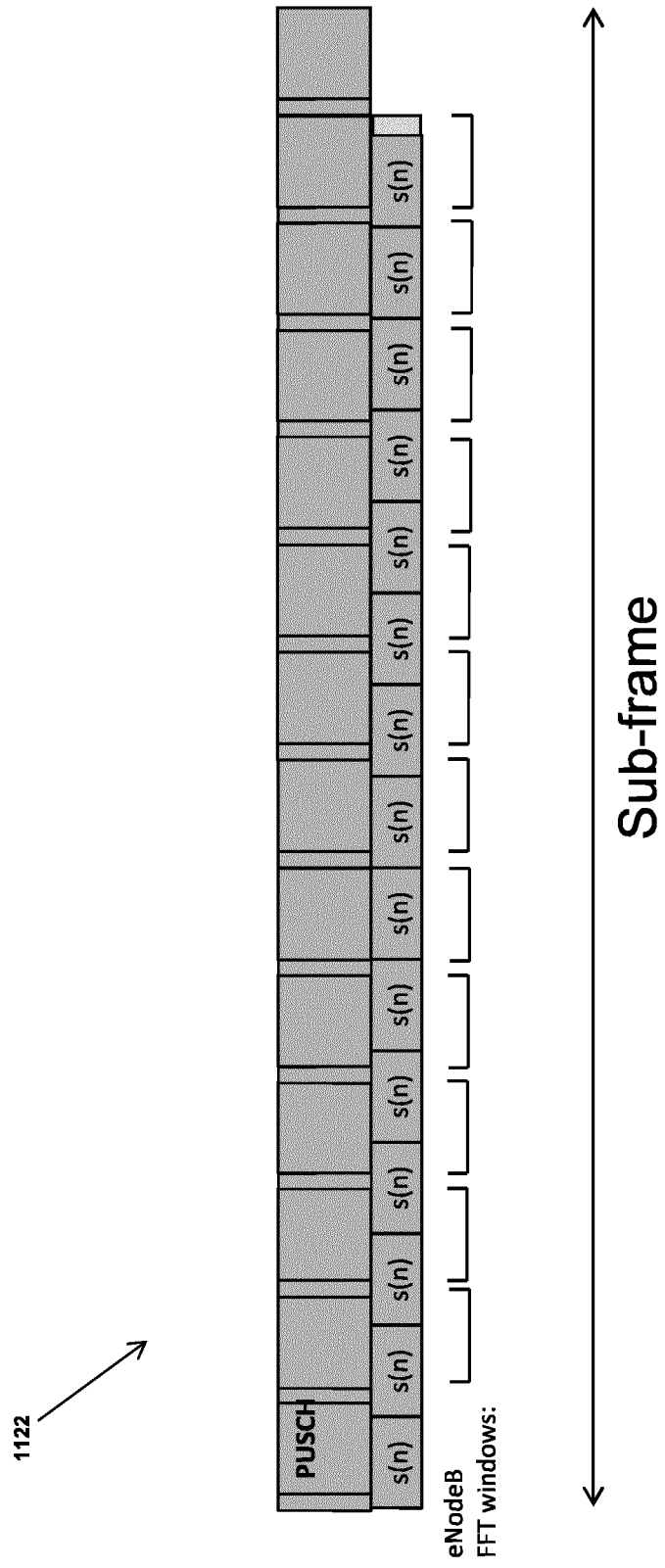
FIGS. 11-13 are signaling diagrams illustrating exchange of signals in embodiments of a network.

FIG. 11 provides an illustration 1122 of the short sequences s(n). By this repetition of the short sequence, each short sequence will act as a cyclic prefix for the next short sequence. Here, the short sequence is repeated 15 times, and succeeded by a smaller part of the short sequence. This last part of the short sequence is inserted in the end such that the preamble covers the whole length of the last receiver FFT window.

Consequently, the short sequence used to construct the preamble sequence is arranged as cyclic prefix for neighboring short sequences.

Figure 12:
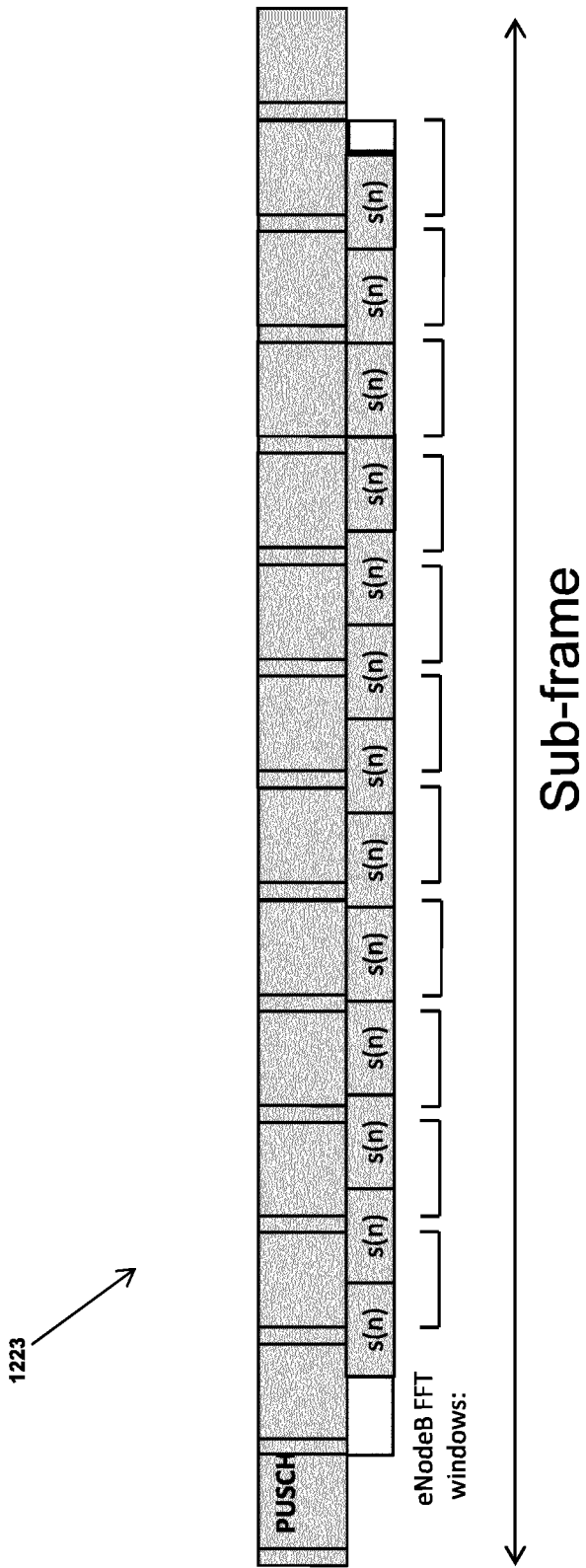
Figure 13:
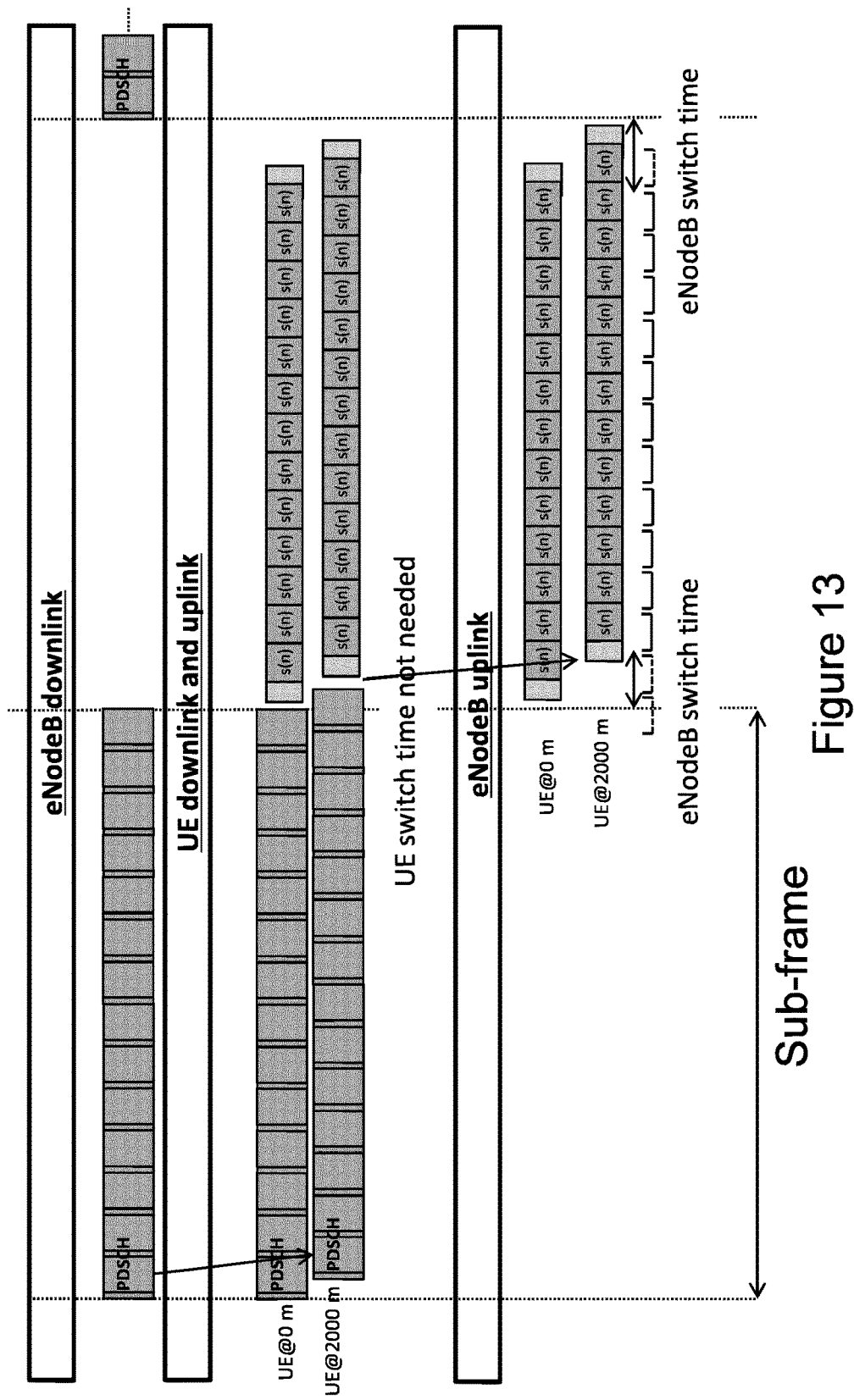

A preamble sequence 1223 suited for a TDD (Time-Division Duplex) system is illustrated in FIG. 12, see also FIG. 13. Here, the preamble is shortened such that it begins later compared to the case shown in FIG. 11.

Preamble Detector in eNodeB

Turning now to the details of how a preamble is detected in an eNodeB, i.e., in the preamble receiver.

Figure 27:
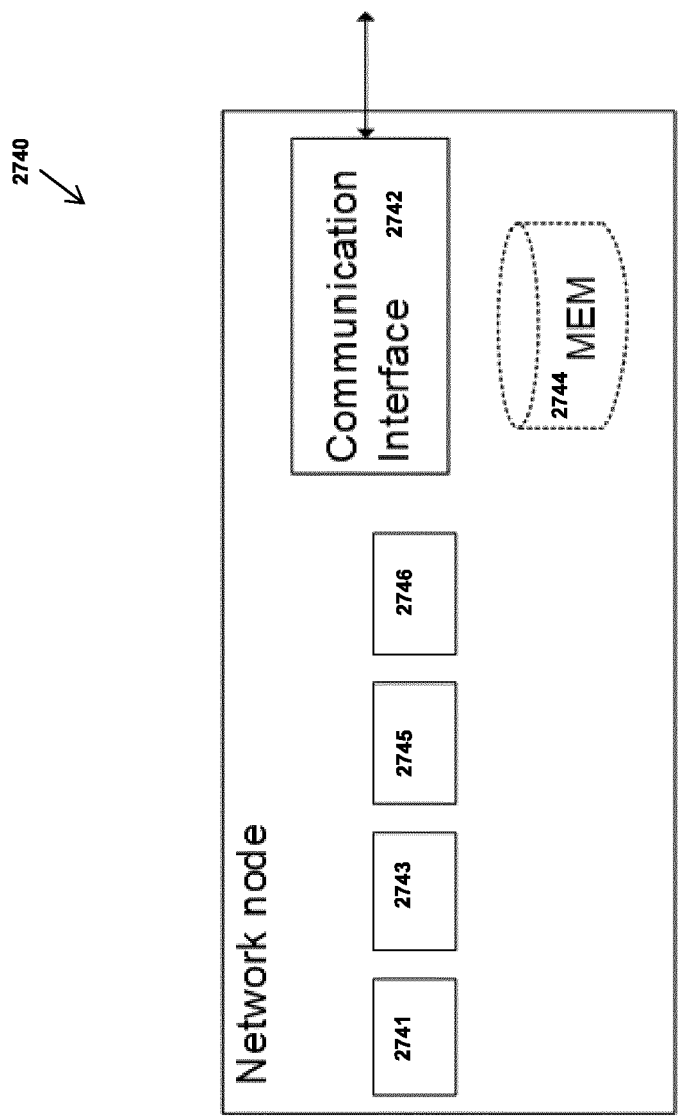
FIG. 27 is a block diagram illustrating embodiments of a receiver system.

A network node 2740 comprising a preamble receiver 2741 arranged to perform the steps disclosed below is shown in FIG. 27.

Figure 14:
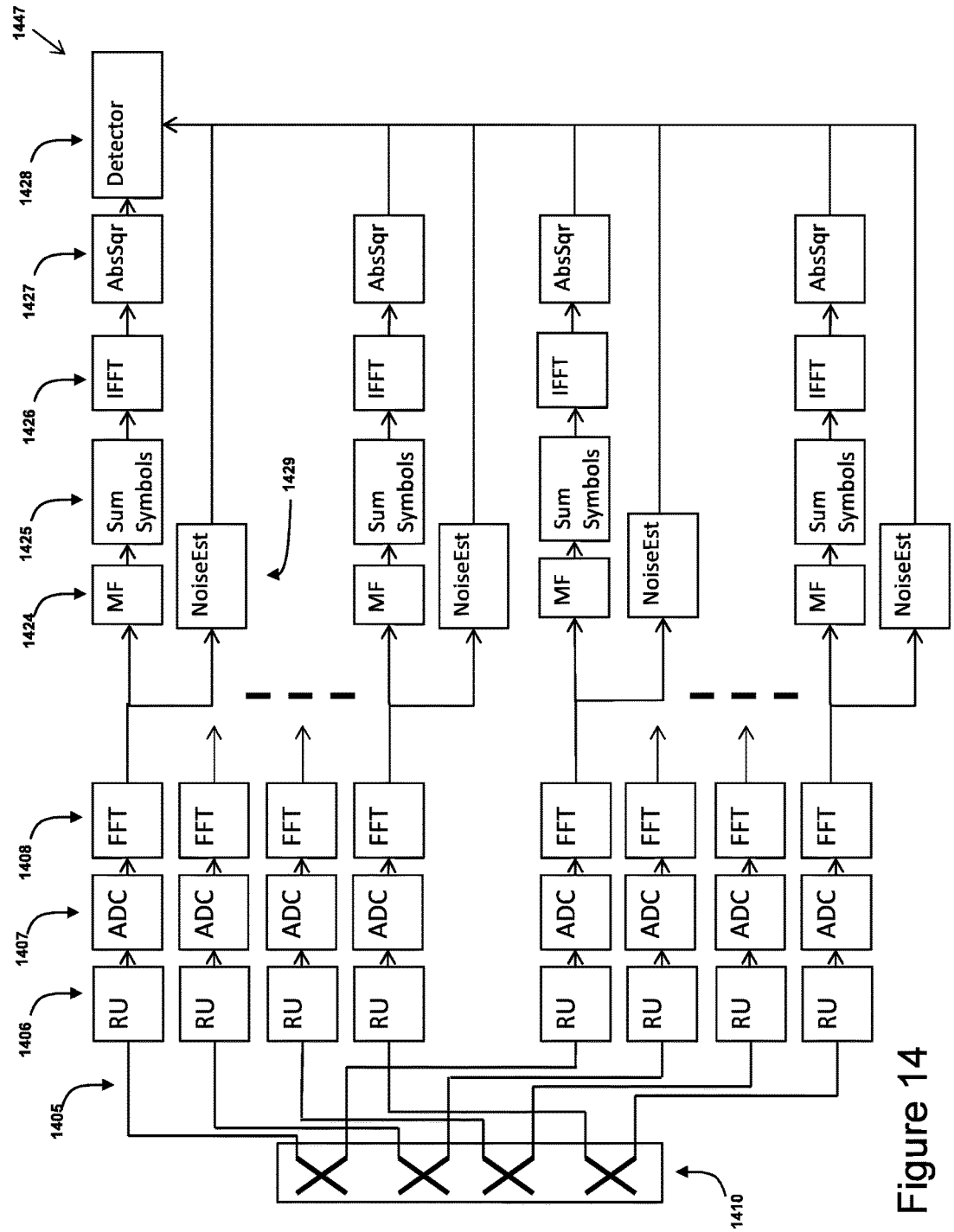
FIGS. 14-25 are block diagrams illustrating embodiments of a receiver system.

A receiver structure for preamble detection is illustrated in FIG. 14. Here, the radio signals 1405 from the antenna elements 1410 are received in radio units 1406, followed by an Analog-to-Digital Conversion, ADC, 1407.

Model the radio transmission from mobile to base-station, for receiver antenna number a by an L tap FIR filter h(m,a)

$$r(n, a) = \sum_{m=0}^{L-1} h(m, a)x(n - m - d) + w(n, a) + \tilde{w}(n, a) \quad (4)$$

Where x(n) is the transmitted sequence, w(n, a) is additive white Gaussian noise with variance $2\sigma_w^2(a)$, $\tilde{w}(n,a)$ is interference, and d corresponds to a round-trip delay for current mobile. This round-trip delay is limited by the cell radius, i.e., $$0 \le d \le D - 1. \quad (5)$$

where $$D = \left\lfloor \frac{2 \times R_{cell}}{3 \cdot 10^5} F_s \right\rfloor \quad (6)$$

and $R_{cell}$ is the cell radius in kilometers, $F_s$ is the sampling rate, and $\lfloor x \rfloor$ denotes rounding towards nearest lower integer.

Figure 15:
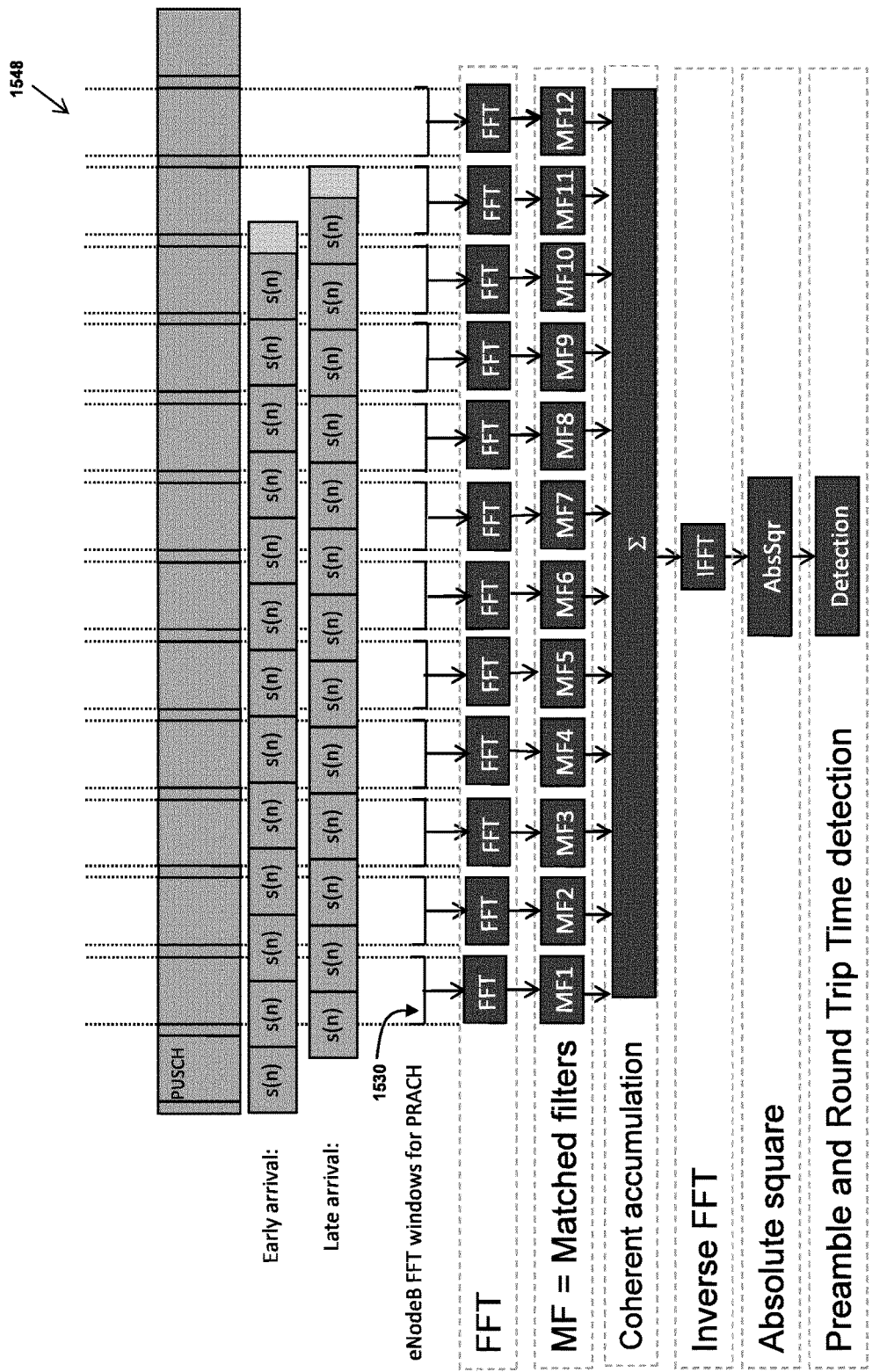
Figure 16:
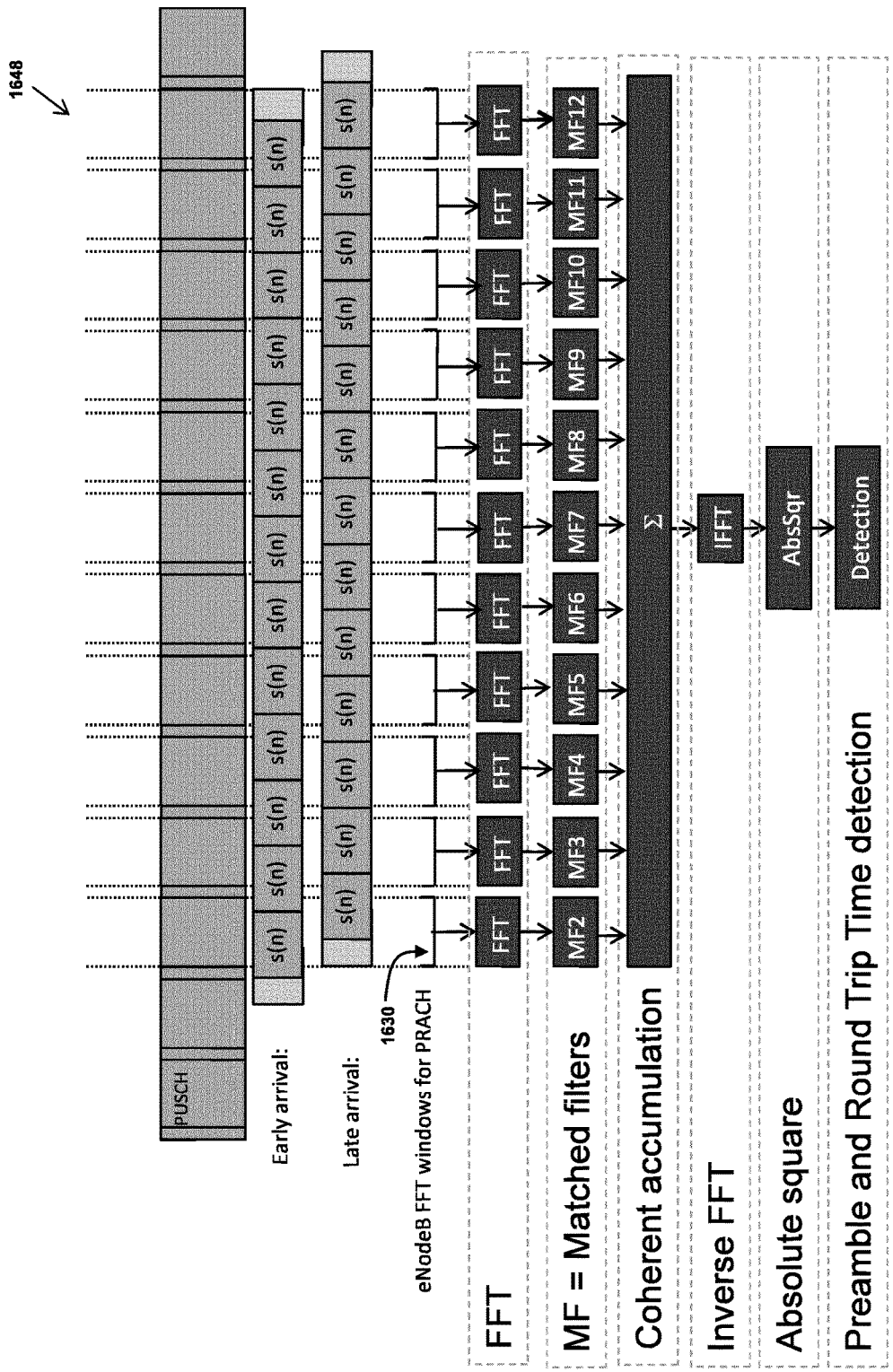
Figure 17:
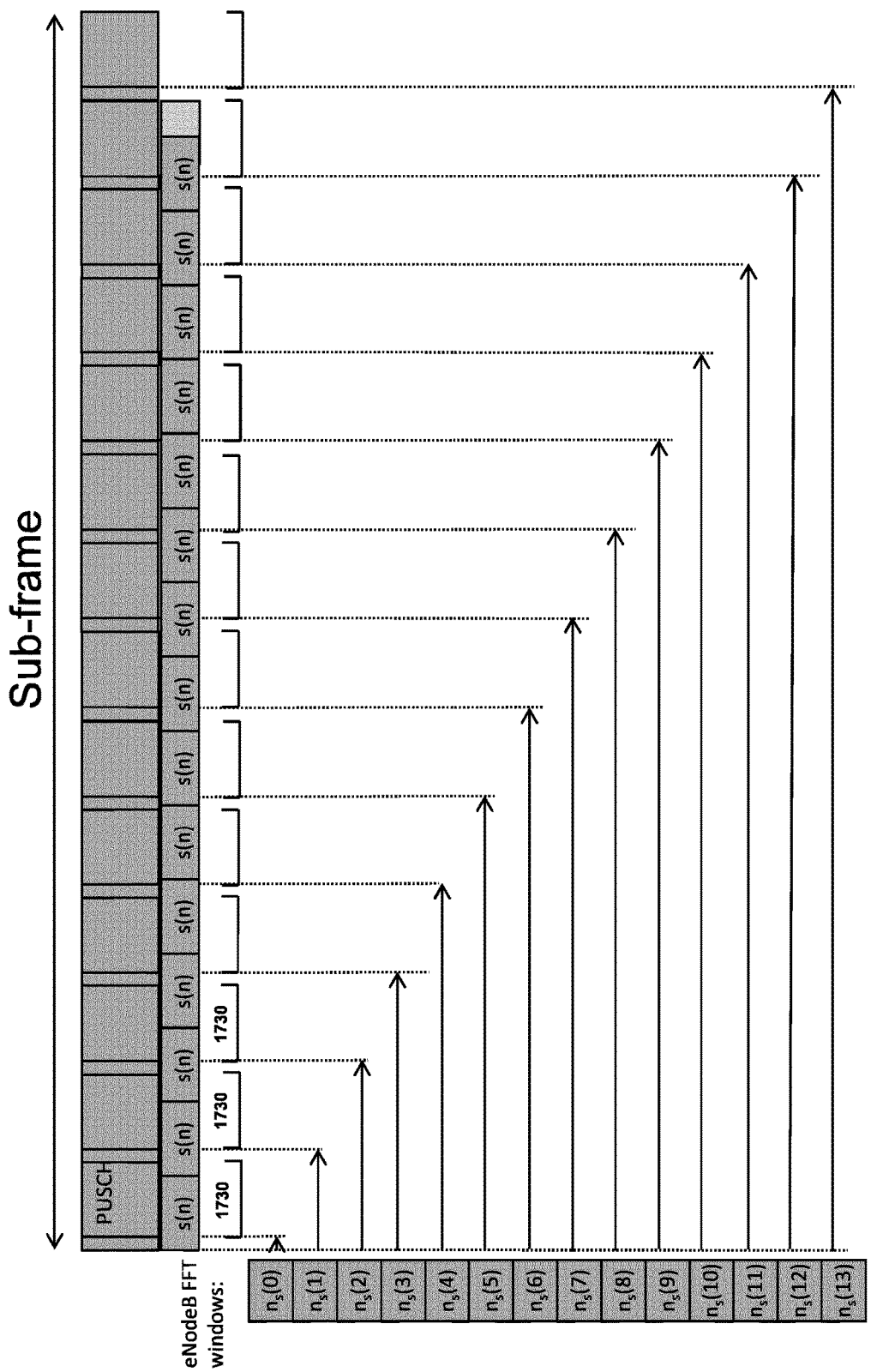

These time-domain signals are inputs to Fast Fourier Transforms, FFT, 1408 as illustrated in FIG. 14. See also illustrations in FIGS. 15 and 16 where the input signals to the FFT processing, i.e., the FFT windows 1530, 1630 are illustrated. The FFT window positions $n_s(p)$ correspond to the distance in time between the start of the first short sequence and each SC-FDMA or OFDM symbol in uplink, see illustration in FIG. 17. In this illustration, the start of the first short sequence is placed at the start of the subframe. For example, in LTE Release 8, the first cyclic prefix in each slot is 160 samples, while the remaining cyclic prefixes are 144 samples. Each SC-FDMA or OFDM symbol is 2048 samples such that the values of $n_s(p)$ as in Table 1 below follow.

TABLE 1

| Time shift in samples between sequential OFDM (or SC-FDMA) symbols. | |
|---|---|
| p | $n_s$ (p) [samples] |
| 0 | 160 |
| 1 | 160 + 144 + 2048 |
| 2 | 160 + 2 * 144 + 2 * 2048 |
| 3 | 160 + 3 * 144 + 3 * 2048 |
| 4 | 160 + 4 * 144 + 4 * 2048 |
| 5 | 160 + 5 * 144 + 6 * 2048 |
| 6 | 160 + 6 * 144 + 6 * 2048 |
| 7 | 2 * 160 + 6 * 144 + 7 * 2048 |
| 8 | 2 * 160 + 7 * 144 + 8 * 2048 |
| 9 | 2 * 160 + 8 * 144 + 9 * 2048 |
| 10 | 2 * 160 + 9 * 144 + 10 * 2048 |
| 11 | 2 * 160 + 10 * 144 + 11 * 2048 |
| 12 | 2 * 160 + 11 * 144 + 12 * 2048 |
| 13 | 2 * 160 + 12 * 144 + 13 * 2048 |

Non-Coherent Antenna Accumulation

For each antenna a and FFT window p, calculate a DFT or FFT over $N_{FFT}$ samples:

$$R(k, p, a) = \frac{1}{\sqrt{N_{FFT}}} \sum_{n=0}^{N_{FFT}-1} r(n + n_s(p), a)e^{-j2\pi kn/N_{FFT}} \quad (7)$$

for $k = 0, \ldots, N_{FFT} - 1$ and $a = 0, \ldots, N_a - 1$.

The PRACH preamble in the frequency domain is obtained by extracting sub-carriers corresponding to those sub-carriers used for PRACH, i.e. $N_{seq}$ samples, where $N_{seq} \le N_{FFT}$ $$R_{PRACH}(k, p, a)=R(k+k_0, p, a), \quad (8)$$

for k=0, ..., $N_{seq}$−1 and $k_0 = n_{PRB}^{RA} N_{sc}^{RB} - N_{RB}^{UL} N_{sc}^{RB}/2$. Using the same notation as in previous section, and with the use of Zadoff-Chu sequences, then $N_{seq}=N_{ZC}$.

Thus, the preamble transmitter 2636 is according to an aspect, arranged to transmit the preamble sequence over a Physical Random Access Channel, PRACH, of a radio access network.

Multiply with a matched filter (of $N_{seq}$ coefficients) in the frequency domain $$C_{MF,v}(k, p, a) = \frac{1}{\sqrt{N_{seq}}} P_v^*(k, p) \cdot R_{PRACH}(k, p, a). \quad (9)$$

This matched filter is constructed from the DFT of known short sequence and the cyclic shift of this short sequence. The cyclic shift corresponds to a frequency-domain rotation with the shift $n_{shift}(p)$:

$$P_v(k, p) = e^{j2\pi k n_{shift}(p)/N_{FFT}} \frac{1}{\sqrt{N_{seq}}} \sum_{n=0}^{N_{seq}-1} x_u(n) e^{-j2\pi kn/N_{seq}}. \quad (10)$$

The output from the matched filters corresponding to the same antenna, but from different FFT windows, can now be coherently added as $$C_v(k, a) = \sum_{p=p_0}^{p_0+P-1} C_{MF,v}(k, p, a) \quad (11)$$

where $p_0$ is the index of the first, out of P, FFT windows included in the PRACH preamble detector. See, e.g., FIGS. 11 and 15 for which $p_0=1$ and P=12. For the format in FIGS. 12 and 16, only FFT window 2 to 12 are used such that $p_0=2$ and P=11.

Thus, according to an aspect, the preamble receiver comprises a preamble detector arranged to determine a plurality of FFTs from a plurality of FFT windows, and to coherently combine the FFT results into a combined received preamble signal.

Now, in order to detect preamble and estimate round-trip time, the output from the IFFT will be transformed to the time domain. Calculate an IDFT, of size $N_{IFFT}$, resulting in a correlation vector of length $N_{IFFT}$:

$$C_v(m, a) = \frac{1}{\sqrt{N_{IFFT}}} \sum_{k=0}^{N_{seq}-1} C_v(k, a) e^{j2\pi km/N_{IFFT}} \quad (12)$$

for m=0, . . . , $N_{IFFT}-1$. Selecting $N_{IFFT} > N_{seq}$ corresponds to an interpolation, which can be done in order to increase the resolution of the timing estimation.

A simple estimator of the noise variance $\hat{\sigma}_w^2(a)$ can be formulated as $$\hat{\sigma}_w^2(a) = \sum_{p=p_0}^{p_0+P-1} \sum_{k=0}^{N_{seq}-1} |C_{MF,v}(k, p, a)|^2. \quad (13)$$

As decision variables, the absolute square for each value of the cross-correlation vector is used, normalized with the estimated noise variance $\hat{\sigma}_w^2(i)$, $$\lambda_v(m) = \sum_{a=0}^{N_a-1} \frac{|c_v(m, a)|^2}{\hat{\sigma}_w^2(a)} \quad (14)$$

where a summation over antennas, including polarizations, is included. A preamble detector and round-trip time estimator might be formulated as searching for the maximum value in this vector of normalized absolute squared correlations and comparing this maximum value with a threshold.

Preamble number v is detected if the absolute squared value of this autocorrelation exceeds a threshold $$\lambda_v(m) = \sum_{a=0}^{N_a-1} \frac{|c_v(m, a)|^2}{\hat{\sigma}_w^2(a)} \geq \lambda_{Threshold} \quad (15)$$

for at least one value of m, within the search window of size D. In other words, the preamble with index v is detected if there is an $m \in [0,D-1]$ such that $\lambda_v(m) \geq \lambda_{Threshold}$. This preamble detector threshold $\lambda_{Threshold}$ should be selected with care such that the false detection rate is low without causing a too low detection rate.

A timing estimate follows as the value of m which corresponds to the maximum value of $\lambda_v(m)$ i.e.

$$\hat{m} = \arg\max_m \left( \sum_{a=0}^{N_a-1} \frac{|c_v(m, a)|^2}{\hat{\sigma}_w^2(a)} \right) \quad (16)$$

such that the timing error in seconds equals $$\hat{T}_{err} = \hat{m}/(\Delta f \cdot N_{IFFT}). \quad (17)$$

Low-Coherence Case

The coherent addition of signals in (11) should not be done when the coherence time is low. This coherence time is depending on the rate of time variation of all distortions between baseband transmitter and receiver. For example, a high Doppler spread will lead to a fast time-varying channel which decreases the coherence time. Also, large frequency errors or large phase noise leads to a decreased coherence time such that the time should be reduced for which the coherent addition is done.

Instead of adding all FFT windows coherently as in (11), a smaller number of FFT windows might be added, i.e., $$C_v(k, a, c) = \sum_{p=p_0}^{p_0+P-1} W_{coh}(p, c) \cdot C_{MF,v}(k, p, a) \quad (18)$$

where $W_{coh}(p,c)$, c=0, . . . , $N_c-1$ is used to control the coherence time. See for example FIGS. 18 and 19, where only two FFT windows are coherently added $$C_v(k, a, c) = \sum_{p=1+2c}^{2+2c} C_{MF,v}(k, p, a) \quad (19)$$

before the IFFT $$c_v(m, a, c) = \frac{1}{\sqrt{N_{IFFT}}} \sum_{k=0}^{N_{seq}-1} C_v(k, a, c) e^{j2\pi km/N_{IFFT}}. \quad (20)$$

Figure 18:
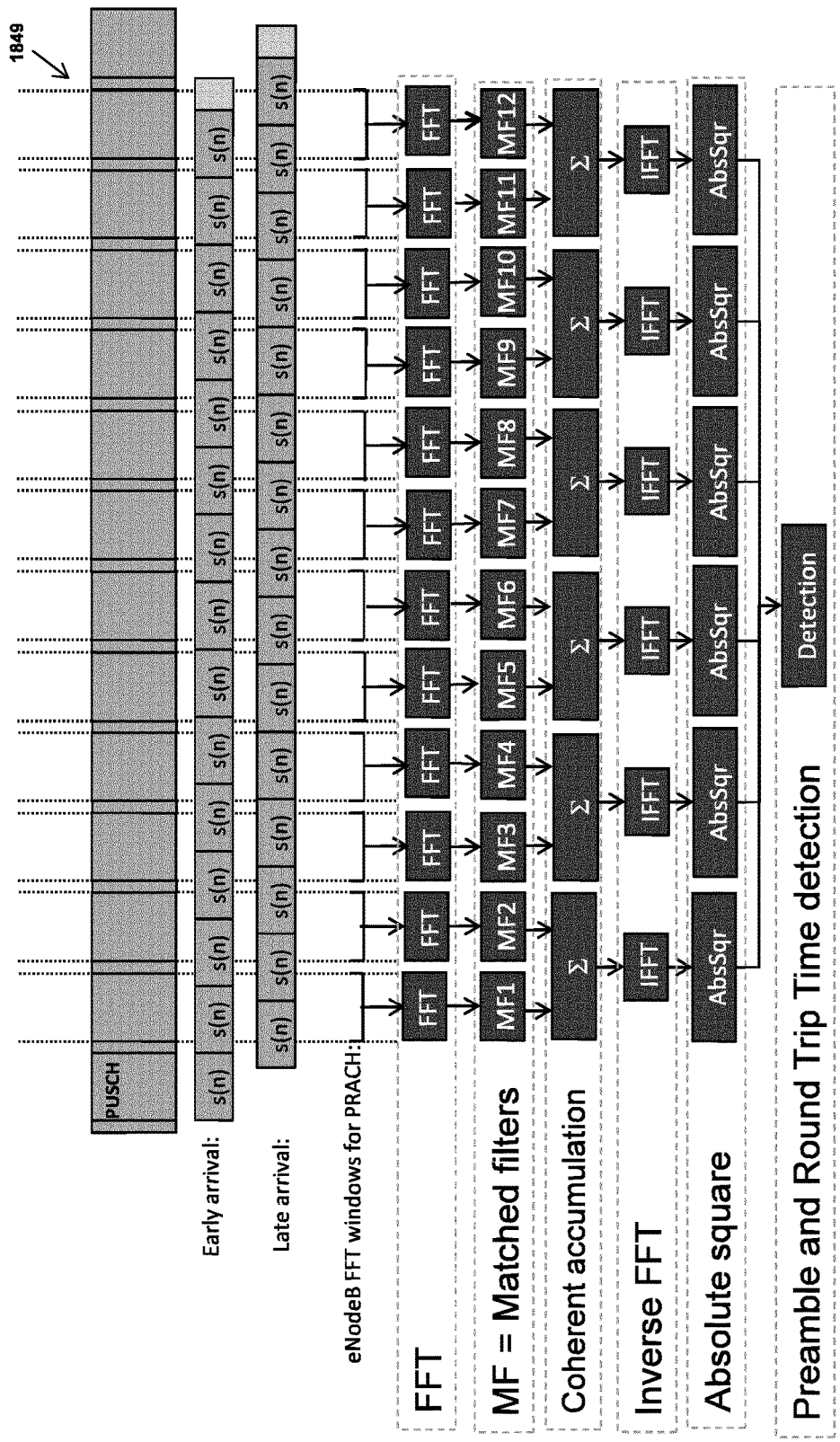
Figure 19:
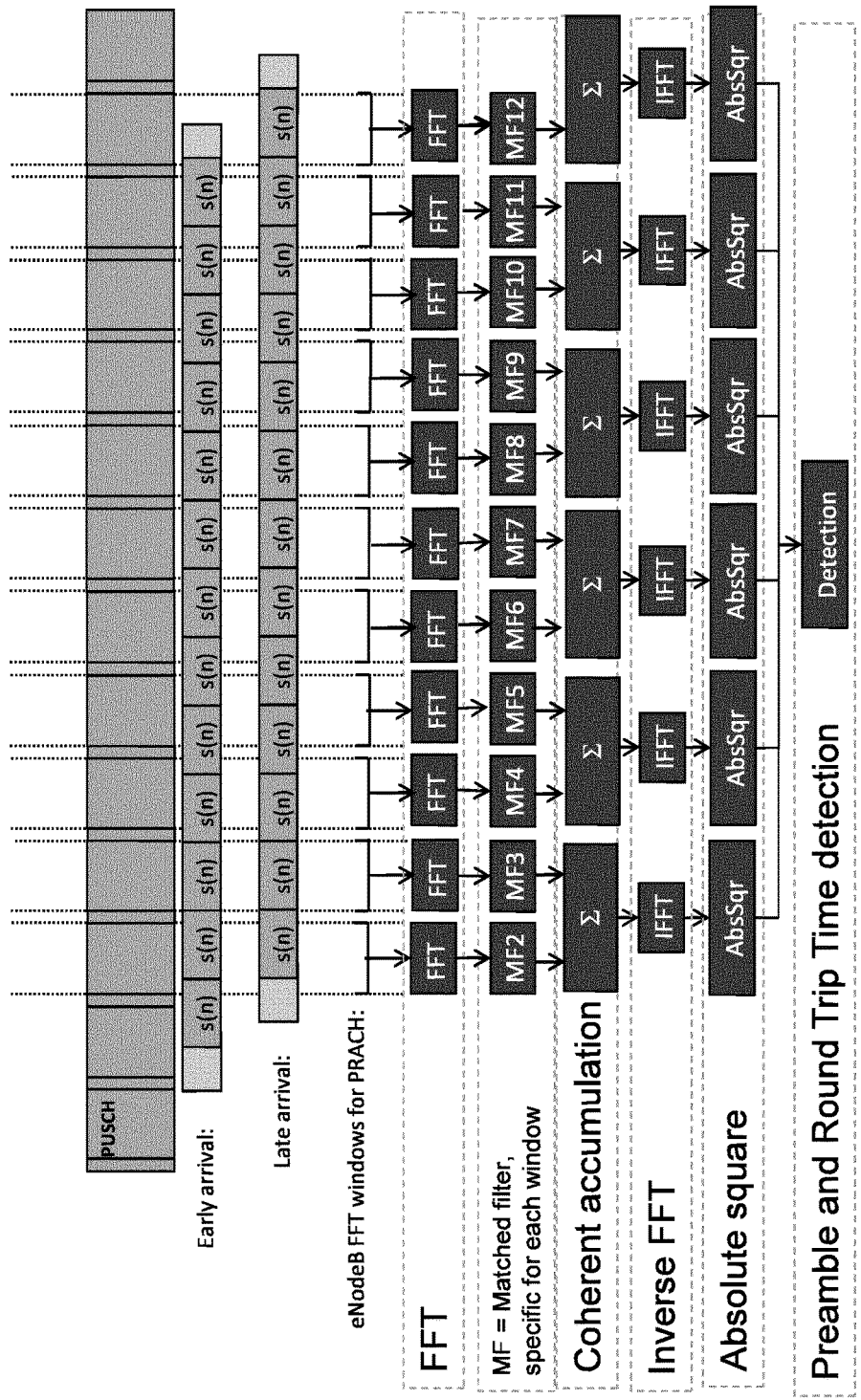

Note that FIG. 18 is an illustration where a few more repetitions of the short sequence are used as compared to FIG. 19. The decision variable can now be formulated as $$\lambda_v(m) = \sum_{c=0}^{N_c-1} \sum_{a=0}^{N_a-1} \frac{|c_v(m, a, c)|^2}{\hat{\sigma}_w^2(a)}. \quad (21)$$

Thus, according to an aspect, the preamble receiver comprises a preamble detector arranged to determine a plurality of FFTs from a plurality of FFT windows, and to non-coherently combine the FFT results into a combined received preamble signal.

Frequency-Domain Beam Forming

Figure 20:
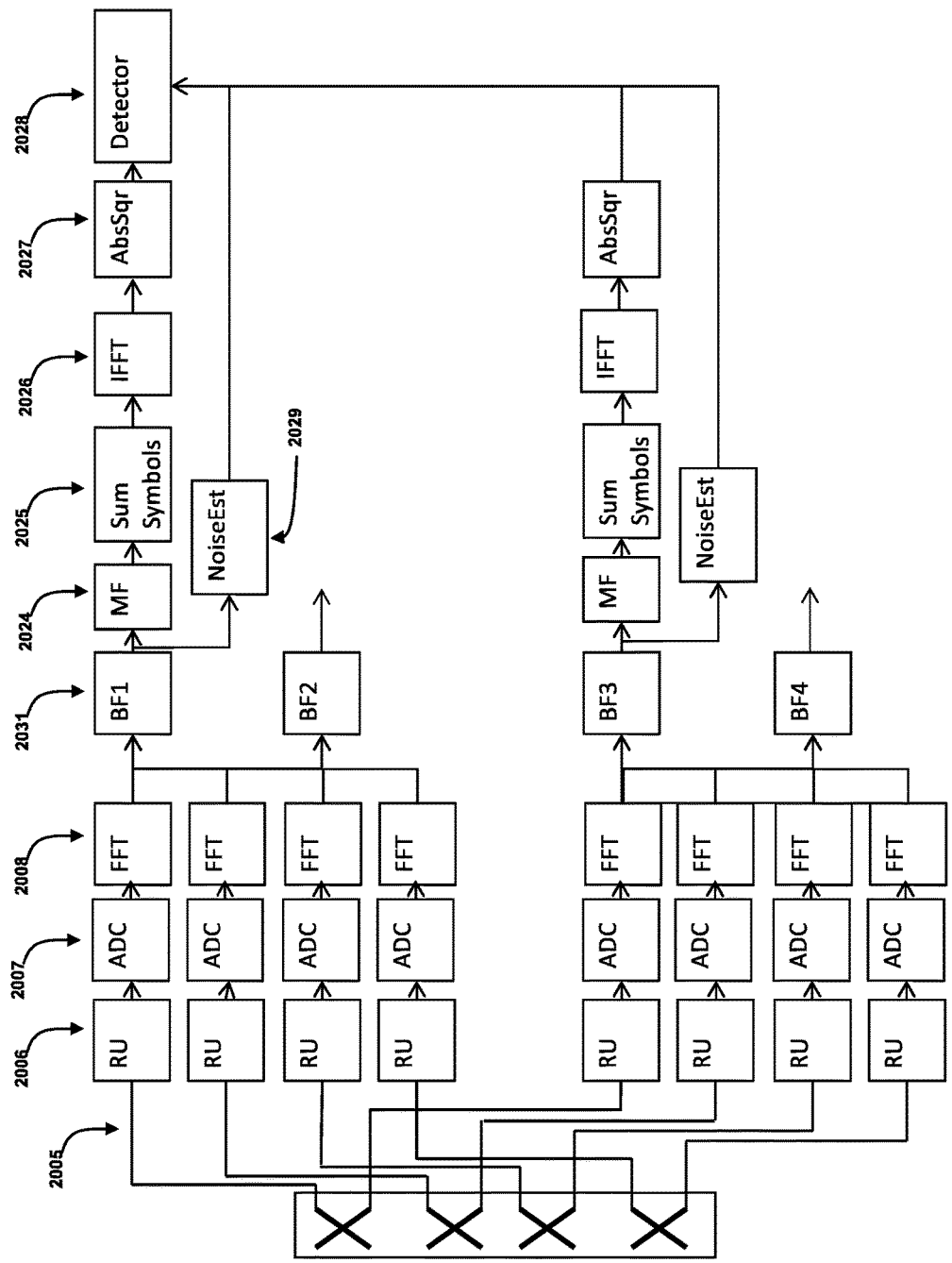

A beamforming gain can be achieved if several antenna signals are coherently added with individual scaling and phase shifts. For frequency-domain beamforming, these scaling and phase shifts are applied after the FFT, see illustration in FIG. 20. Here, the signals from the antennas are connected to a Radio Unit (RU) followed by an ADC and FFT. Frequency-domain signals from many antennas after the FFT are then combined in a Beamforming (BF). In this way, the beamforming can be different for different sub-carriers. For example, one or several PRACH specific beamformings can be applied to those sub-carriers which are used for PRACH. By these beamformings, the PRACH preamble detector is sensitive in several spatial directions.

Denote the PRACH preamble in the frequency domain after extracting sub-carriers corresponding to those sub-carriers used for PRACH as $$R_{PRACH}(k, p, a) = R(k+k_0, p, a). \tag{22}$$

The beamformed signal for beam number b, with the beamforming weights and phase shift factors denoted by $W_{BF}(a, k, b)$ for sub-carrier k and antenna a, can be written as $$R_{BF,PRACH}(k, p, b) = \sum_{a=0}^{N_a-1} W_{BF}(a, k, b) \cdot R_{PRACH}(k, p, a). \tag{23}$$

This beamformed signal is multiplied with a matched filter (of $N_{seq}$ coefficients) in the frequency domain $$C_{MF,v}(k, p, b) = \frac{1}{\sqrt{N_P}} P_v^*(k, p) \cdot R_{BF,PRACH}(k, p, b). \tag{24}$$

Here, the beamforming and the matched filtering can be done simultaneously in a single multiplication, i.e., $$C_{BFMF,v}(k, p, b) = \sum_{a=0}^{N_a-1} W_{BFMF}(k, p, a, b) \cdot R_{PRACH}(k, p, a). \tag{25}$$

where $$W_{BFMF,v}(k, p, a, b) = \frac{1}{\sqrt{N_P}} W_{BF}(a, k, b) \cdot P_v^*(k, p) \tag{26}$$

which can be precalculated and stored in memory 2744.

The output from the matched filters corresponding to the same beamforming, but from different FFT windows, can now be coherently added as $$C_{BFMF,v}(k, b) = \sum_{p=p_0}^{p_0+P-1} C_{BFMF,v}(k, p, b) \tag{27}$$

where $p_0$ is the index of the first FFT window included in the PRACH preamble detector.

Now, in order to detect preamble and estimate round-trip time, the output from the IFFT will be transformed to the time domain. Calculate an IDFT, of size $N_{IFFT}$, resulting in an correlation vector of length $N_{IFFT}$ $$C_{BFMF,v}(m, b) = \frac{1}{\sqrt{N_{IFFT}}} \sum_{k=0}^{N_{seq}-1} C_{BFMF,v}(k, b) e^{j2\pi km/N_{IFFT}}. \tag{28}$$

Selecting $N_{IFFT} > N_p$ corresponds to an interpolation which can be done in order to increase the resolution of the timing estimation.

A simple noise variance $\hat{\sigma}_w^2(b)$ can be estimated as $$\hat{\sigma}_w^2(b) = \frac{1}{PN_{seq}} \sum_{p=p_0}^{p_0+P-1} \sum_{k=0}^{N_{seq}-1} |C_{MF,v}(k, p, b)|^2. \tag{29}$$

As decision variable, an absolute square of each value of the cross-correlation vector is used, normalized with the estimated noise variance $\hat{\sigma}_w^2(b)$, $$\lambda_v(m, b) = \frac{|c_v(m, b)|^2}{\hat{\sigma}_w^2(b)}. \tag{30}$$

Here several polarizations might be added into the decision variable. A preamble detector and round-trip time estimator might be formulated as searching for the maximum value in this vector of normalized absolute squared correlations and comparing this maximum value with a threshold.

Preamble number v is detected if the absolute squared value of this autocorrelation exceeds a threshold $$\lambda_v(m, b) = \frac{|c_v(m, b)|^2}{\hat{\sigma}_w^2(b)} \geq \lambda_{Threshold} \tag{31}$$

for at least one value of m, within the search window of size D. In other words, the preamble with index v is detected if there is an $m \in [0, D-1]$ such that $\lambda_v(m,b) \geq \lambda_{Threshold}$. This preamble detector threshold $\lambda_{Threshold}$ should be selected with care such that the false detection rate is low without causing a too low detection rate.

Time-Domain Beam Forming

Figure 21:
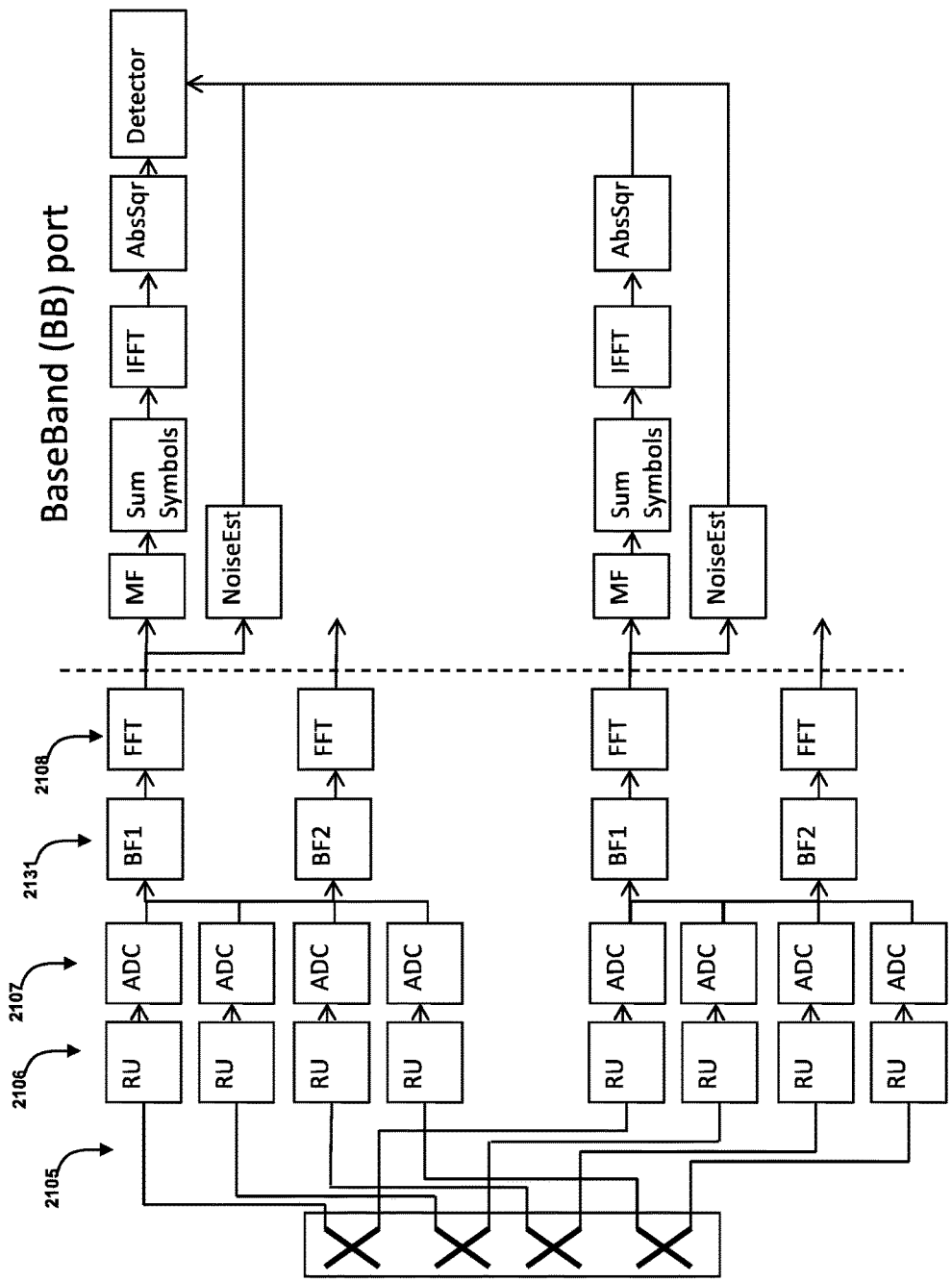
Figure 22:
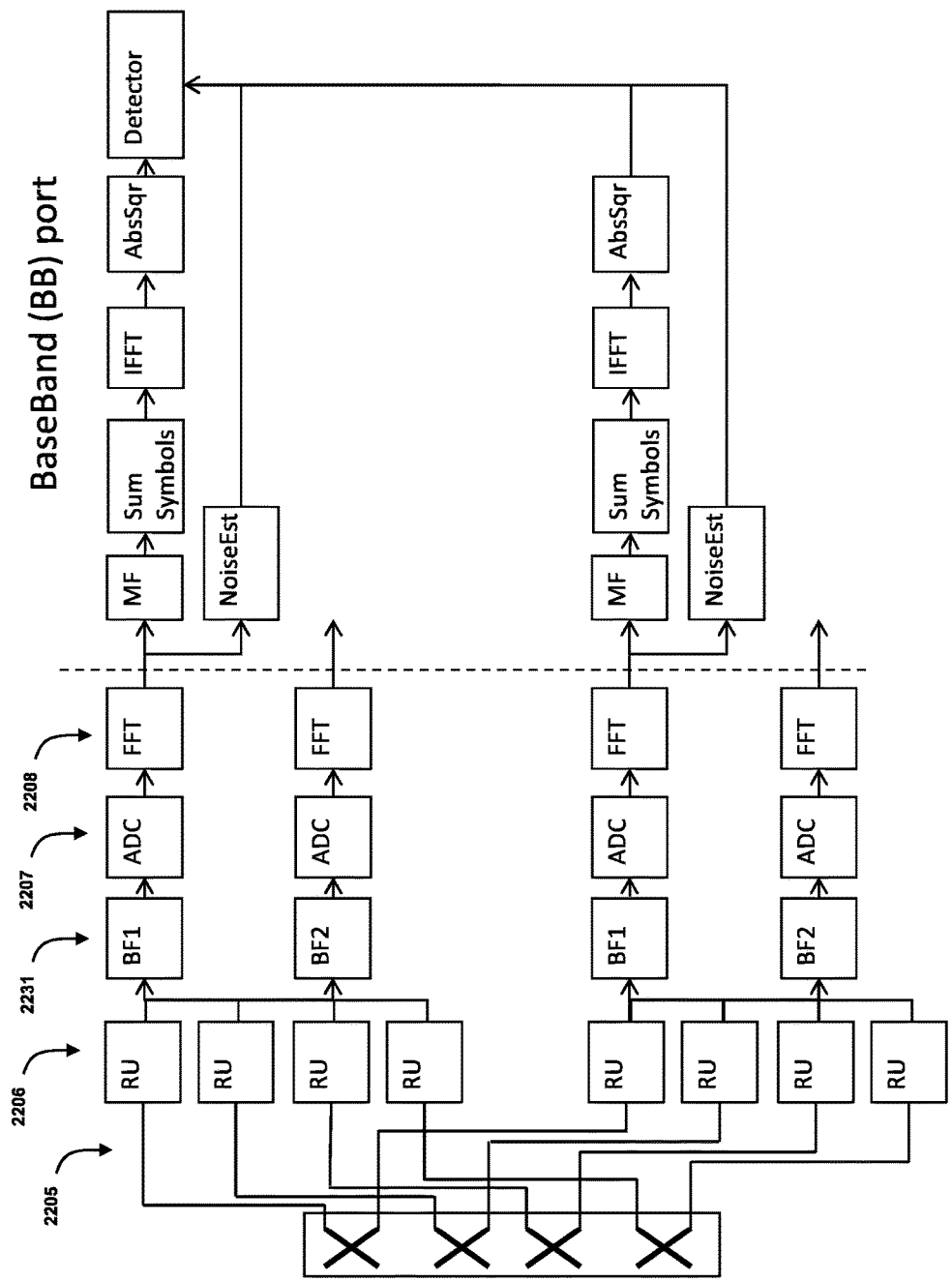

For time-domain beamforming, the beamforming scaling and phase shifts are applied 2131 before the FFT 2108, see illustration in FIG. 21. Here, the signals 2105 from the antennas are connected to a Radio Unit, RU, 2106 and an Analog-to-Digital Converter, ADC 2107 followed by a beamforming, BF, 2131, after which the output from the beamforming is processed in an FFT 2108. Time-domain signals from many antennas are thus combined in the beamforming. In this way, the beamforming is the same for all sub-carriers. This beamforming might be done on a digital signal, i.e., after the analog-to-digital converter, ADC, 2107 as in FIG. 21 or on an analog signal, i.e., before ADC 2207, as in FIG. 22.

At initial access, the eNodeB has limited knowledge of the position of the UE. The PRACH receiver must therefore evaluate several beamformings in order to be able to detect the PRACH preamble. With time-domain beamforming, this requires one sequence of processing from FFT to preamble detector per beamforming, see FIG. 21 or 22. The beamforming and FFT support is costly in terms of hardware support and power consumption.

Figure 23:
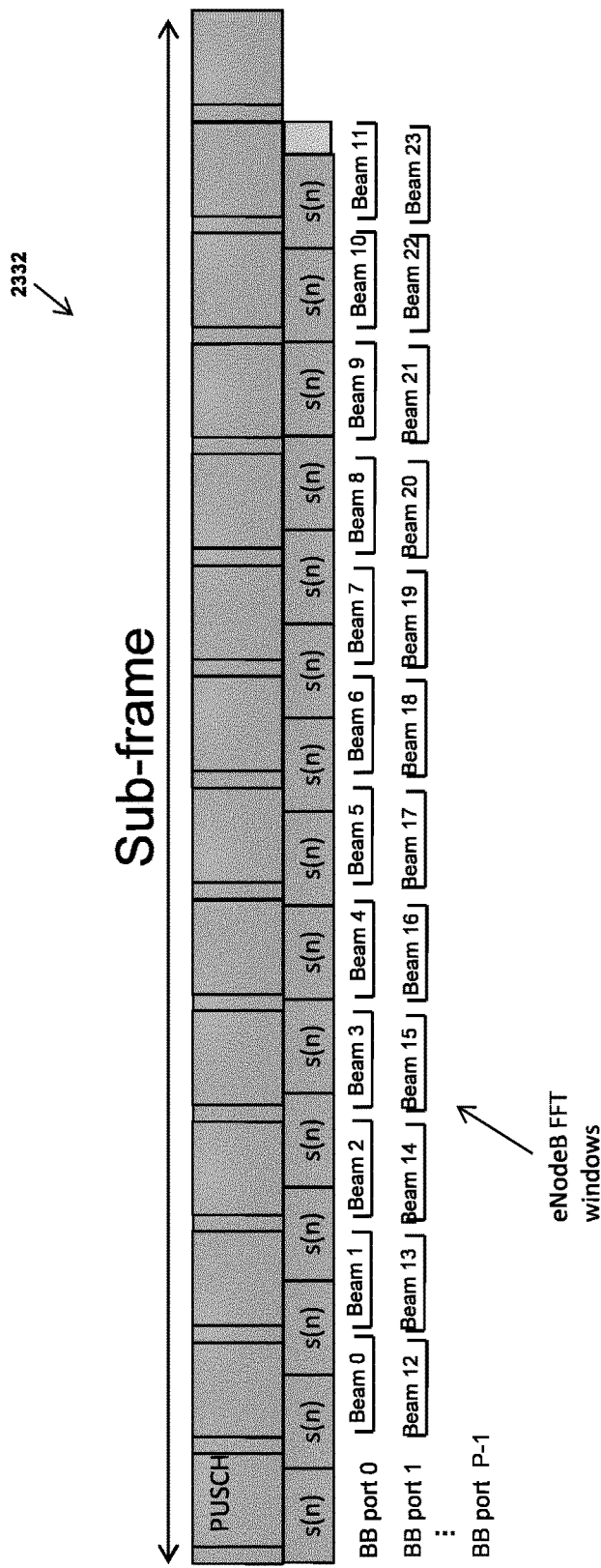

An illustration 2332 is given in FIG. 23 of an approach in which the beamforming is changed between each FFT window. Here the outputs from each beamforming, followed by an FFT, are individually processed in a matched filter, an IFFT, an absolute square calculation, and finally a preamble detector. If the hardware supports several simultaneous beamformings in the same time-window, then several spatial directions can be processed, see FIG. 21 or 22. Each such beamforming is referred to as one baseband, BB, port.

Figure 24:
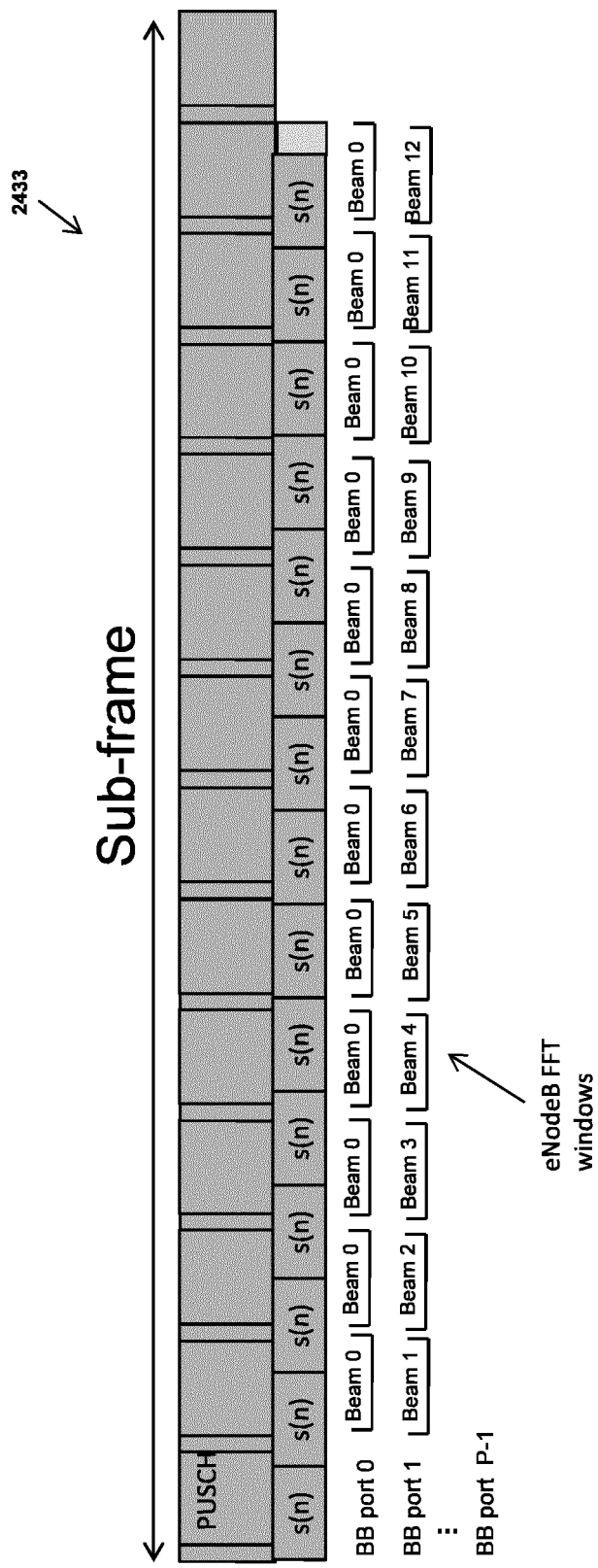

An alternative configuration is illustrated 2433 in FIG. 24. Here, one BB port is used with a fixed time domain beamforming for all time windows of a sub-frame. A second BB port is used to switch beamformings between each window.

Typically, the number of FFT windows for which the analog beamforming is constant equals the number of FFT windows which are included in the same PRACH preamble detection. The number of included FFT windows for a given beam improves the performance of the PRACH preamble detection in terms of improved detection rate.

For UEs with high SNR, i.e., typically located close to the eNodeB, a reliable detection can thus be done with a small number of FFT windows, while UEs with a low SNR, typically located further away from the eNodeB, can in most cases only be done if many, or all, FFT windows are included. By combining detectors with few FFT windows included, i.e., with many different beamforming directions, and detectors with many FFT windows but few beamforming directions, a balance can be achieved between fast preamble detectors with high SNR and slow detection for UEs with low SNR. That is, many PRACH occasions might be needed for UEs with low SNR. This since the baseband ports with many FFT windows included do not search all PRACH directions during each PRACH occasion.

Figure 25:
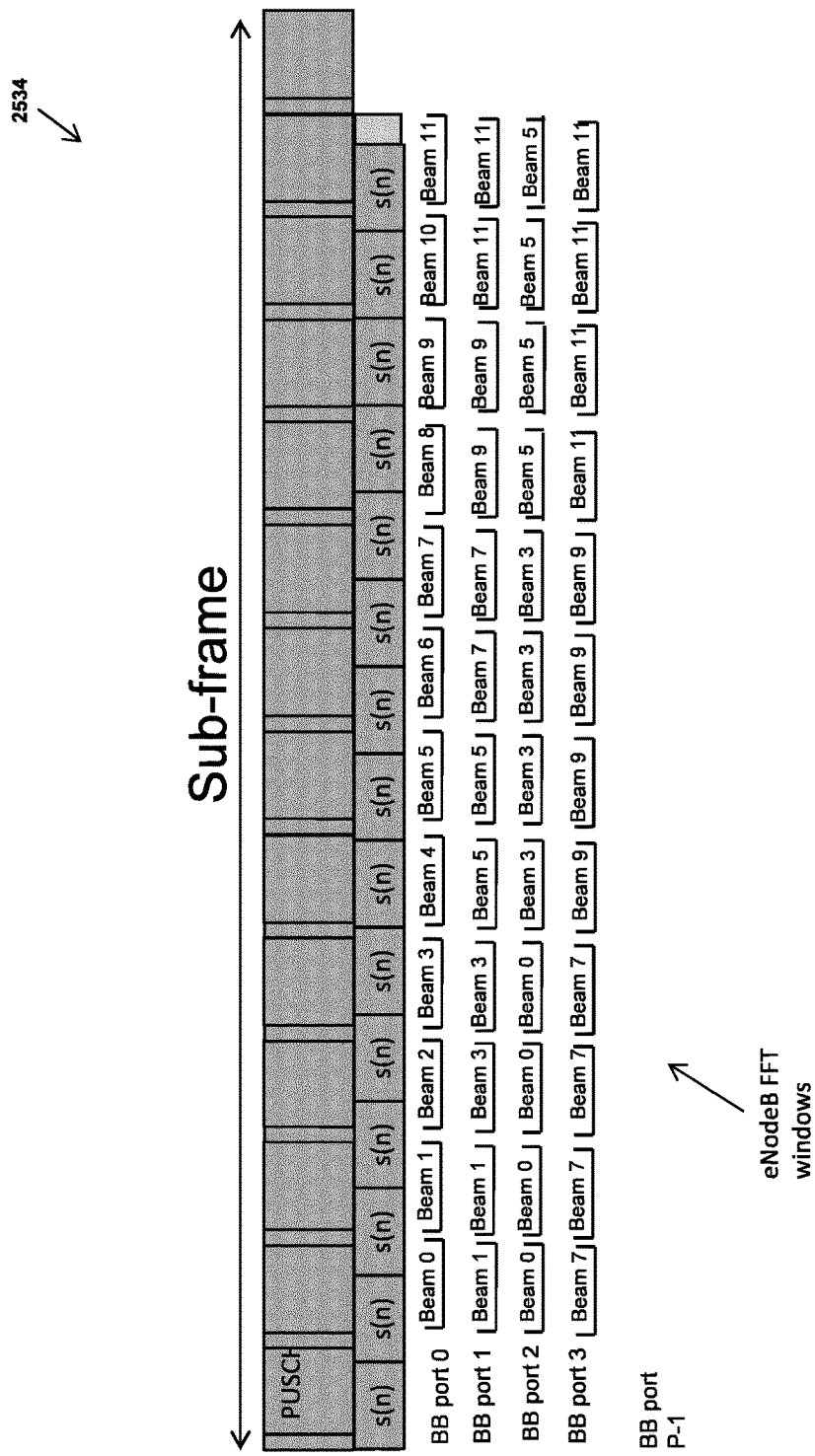

Hence, the present teaching facilitates utilizing the multiple base band ports for different ranges of preamble detection. In FIG. 25, an example is shown where port 0 uses a single FFT window but scans all 12 beams in this example, which point in unique directions in elevation and/or azimuth. Port 1 on the other hand scans every other beam while using double FFT windows. Port 2 scans every fourth beam using four FFT window aggregations. If the beams are narrow, there may be a risk that a UE is located between two scanned beams, which lead to a large SNR loss which cannot be recovered by the doubling of FFT windows. So there is a trade off in down selection of the number of used beams in the preamble search procedure and the increased number of FFT windows. To mitigate this in this example, port 3 uses also every fourth beam and four FFT windows but where the beam pointing directions are interlaced with the beams used for port 2. Hence it is part of the present disclosure that different base band ports scan interlaced beams.

Note that it is possible to use a single index to indicate beams, whereas in reality the beam can in general be pointed in both azimuth and elevation directions.

Consequently, according to an aspect, the preamble receiver disclosed herein is arranged for beamforming, wherein the beamforming weights are configured to change between FFT windows such that the number of spatial directions for which preamble detection is done is increased.

Also, the preamble receiver, according to aspects, comprises hardware support for more than one simultaneous analog beamforming configuration, the preamble receiver being adapted for switching at a first switching rate between spatial directions with one beamforming configuration, and for switching at a second switching rate between spatial directions with another beamforming configuration, the first rate being different from the second rate.

Further, according to aspects, a single IFFT is applied per beam direction and polarization, and the preamble receiver can also be arranged to perform simultaneous beam-forming and matched filtering by a comprised joint filter.

There is further disclosed herein a preamble transmitter and receiver system, comprising at least one preamble transmitter according to the present teaching, and at least one preamble receiver according to the present teaching.

FIG. 26 shows a preamble transmitter 2636 arranged to construct a preamble signal by a preamble sequence generator 2637 connected to a memory unit 2638, and also to transmit the generated preamble signal via a communications interface 2639a, 2639b of the preamble transmitter 2636. The preamble transmitter 2636 is, according to an aspect, a UE in an LTE network.

FIG. 27 shows a network node 2740 comprising a preamble receiver 2741 arranged to receive a radio signal from a preamble transmitter and to detect a preamble signal comprised in the radio signal. The preamble receiver 2741 is connected to a communications interface 2742 comprised in the network node 2740, and to a controller unit 2743 adapted to perform method steps of the present teaching. The network node 2740 further comprises a memory unit 2744.

Also, the present disclosure comprises a network node 2740 comprising the preamble receiver 2741 according to the present teaching.

Figure 30:
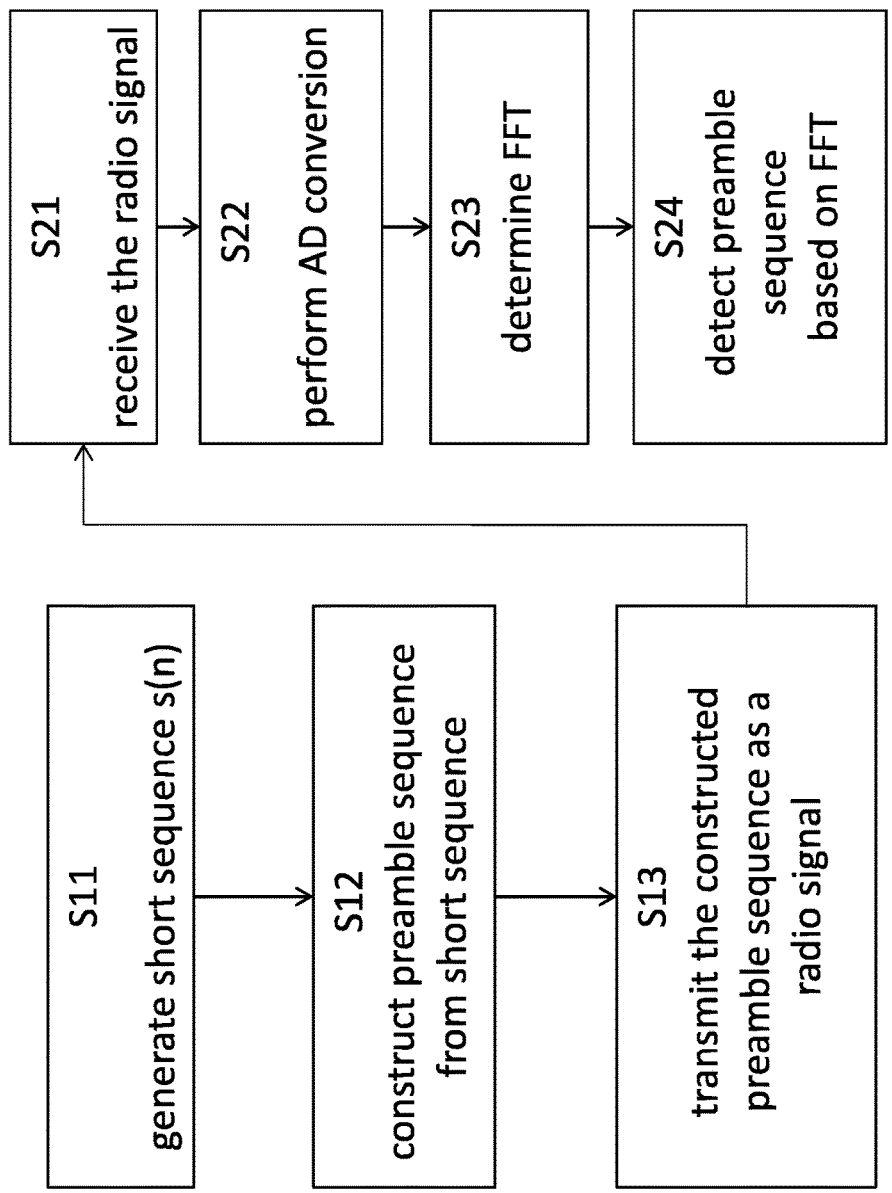

FIGS. 28-30 are flowcharts illustrating embodiments of method steps, which method steps will now be further detailed.

FIG. 28 illustrates a method performed in a preamble transmitter 2636 for transmitting a preamble sequence, the method comprising the steps of generating S11 a short sequence s(n), the short sequence having the same time duration as an OFDM symbol used for carrying data traffic in a radio access network of the preamble transmitter 2636, constructing S12 a preamble sequence by concatenating a plurality of said short sequences in time, and transmitting S13 the constructed preamble sequence as a radio signal to a preamble receiver.

FIG. 29 illustrates a method performed in a preamble receiver 2741, 1447 for receiving a radio signal and detecting a preamble sequence comprised in the radio signal, the method comprising the steps of receiving S21 a radio signal comprising a preamble signal constructed from a plurality of short sequences s(n) via at least one antenna element 1410 and radio unit 1406, the short sequence s(n having the same time duration as an OFDM symbol used for carrying data traffic in a radio access network of the preamble transmitter 2636, performing S22 analog to digital conversion of the radio signal by an ADC 1407 comprised in the preamble receiver, and determining S23 a Fast Fourier Transform, FFT, 1408 of the analog to digital converted signal, wherein the size of the FFT used for detecting the preamble signal is of the same size as for detecting an OFDM symbol used for carrying data traffic in a radio access network, as well as detecting S24 the preamble sequence based on the determined FFT.

According to an aspect, the step of determining S23 an FFT further comprises determining an FFT having a single configuration for detecting OFDM symbols carrying data, and also for detecting preamble sequences.

According to another aspect, the step of detecting S24 comprises determining a plurality of FFTs from a plurality of FFT windows, and also non-coherently combining the FFT results into a combined received preamble signal.

According to a further aspect, the step of detecting S24 comprises determining a plurality of FFTs from a plurality of FFT windows, and also coherently combining the FFT results into a combined received preamble signal.

In other words, there is disclosed herein:

A preamble transmitter 2636 comprising:
- a short sequence generator 2650 arranged to generate a short sequence s(n), and
- a preamble sequence generator 2637 adapted to construct a preamble sequence by concatenating a plurality of said short sequences in time, as well as
- a transmitter unit 2639a,b arranged to transmit the generated preamble sequence as a radio signal, the short sequence s(n) having the same time duration as an OFDM symbol used for carrying data traffic in a radio access network of the preamble transmitter 2636.

A preamble transmitter 2636 arranged to transmit the preamble sequence over a Physical Random Access Channel, PRACH, of a radio access network.

A preamble transmitter 2636, wherein a short sequence used to construct the preamble sequence is arranged as cyclic prefix for neighboring short sequences.

A preamble receiver 2741, 1447, arranged to receive radio signals 1405 comprising a preamble sequence, the preamble receiver 2741, 1447 comprising:
- at least one antenna element 1410 and corresponding radio unit 1406, configured to receive a radio signal, and
- at least one analog to digital converter, ADC, 1407 configured to perform analog to digital conversion of the received radio signal, as well as
- at least one FFT module 1408 arranged to determine a Fast Fourier Transform, of the analog to digital converted signal, and also
- at least one detector 1428 adapted to detect the preamble sequence based on the determined FFT, the preamble sequence comprising a concatenation in time of a plurality of short sequences s(n), wherein each such short sequence s(n) having the same time duration as an OFDM symbol used for carrying data traffic in a radio access network of the preamble receiver 2741, 1447, wherein the size of the FFT used for detecting the preamble signal is of the same size as one used for detecting an OFDM symbol carrying data traffic in a radio access network.

A preamble receiver 2741, 1548, arranged to use one FFT hardware resource and FFT configuration both for detecting OFDM symbols carrying data, and also for detecting preamble sequences.

A preamble receiver 2741, 1849, wherein the preamble receiver comprises a preamble detector arranged to determine a plurality of FFTs from a plurality of FFT windows, and to non-coherently combine the FFT results into a combined received preamble signal.

A preamble receiver 2741, 1548, wherein the preamble receiver comprises a preamble detector arranged to determine a plurality of FFTs from a plurality of FFT windows, and to coherently combine the FFT results into a combined received preamble signal.

A preamble receiver 2741, 1548, wherein a preamble sequence is used for any of initial access, handover, scheduling request, and resynchronization.

A preamble receiver arranged for beamforming, wherein the beamforming weights are configured to change between FFT windows such that the number of spatial directions for which preamble detection is done is increased.

A preamble receiver, wherein the preamble receiver comprises hardware support for more than one simultaneous analog beamforming configuration, the preamble receiver being adapted for switching at a first switching rate between spatial directions with one beamforming configuration, and for switching at a second switching rate between spatial directions with another beamforming configuration, the first rate being different from the second rate.

A preamble receiver, wherein a single IFFT is applied per beam direction and polarization.

A preamble receiver, arranged to perform simultaneous beam-forming and matched filtering by a comprised joint filter.

A preamble transmitter and receiver system, comprising at least one preamble transmitter according to the present teaching, and at least one preamble receiver according to the present teaching.

A network node 2740 comprising the preamble receiver 2741 according to the present teaching.

A method performed in a preamble transmitter 2636 for transmitting a preamble sequence, the method comprising the steps of
- generating S11 a short sequence s(n), the short sequence having the same time duration as an OFDM symbol used for carrying data traffic in a radio access network of the preamble transmitter 2636,
- constructing S12 a preamble sequence by concatenating a plurality of said short sequences in time, and
- transmitting S13 the constructed preamble sequence as a radio signal to a preamble receiver.

A method performed in a preamble receiver 2741, 1447 for receiving a radio signal and detecting a preamble sequence comprised in the radio signal, the method comprising the steps of
- receiving S21 a radio signal comprising a preamble signal constructed from a plurality of short sequences s(n via at least one antenna element 1410 and radio unit 1406, the short sequence s(n having the same time duration as an OFDM symbol used for carrying data traffic in a radio access network of the preamble transmitter 2636,
- performing S22 analog to digital conversion of the radio signal by an ADC 1407 comprised in the preamble receiver, and
- determining S23 a Fast Fourier Transform, FFT, 1408 of the analog to digital converted signal, wherein the size of the FFT used for detecting the preamble signal is of the same size as for detecting an OFDM symbol used for carrying data traffic in a radio access network, as well as
- detecting S24 the preamble sequence based on the determined FFT.

The invention claimed is:

1. A preamble receiver configured to receive radio signals comprising a preamble sequence, the preamble receiver comprising:
   at least one antenna element and corresponding radio unit configured to receive a radio signal;

at least one analog to digital converter configured to perform analog to digital conversion of the received radio signal;

at least one Fast Fourier Transform (FFT) circuit configured to determine a FFT of the analog to digital converted signal;

at least one detector configured to detect the preamble sequence based on the determined FFT;

wherein the preamble sequence comprises a concatenation in time of a plurality of short sequences, wherein each such short sequence has a same time duration as an orthogonal frequency-division multiplexing (OFDM) symbol used for carrying data traffic in a radio access network of the preamble receiver, wherein a size of the FFT used for detecting the preamble signal is the same size as one used for detecting an OFDM symbol carrying data traffic in the radio access network.

2. The preamble receiver of claim 1, wherein the preamble receiver is configured to use one FFT hardware resource and FFT configuration both for detecting OFDM symbols carrying data and for detecting preamble sequences.

3. The preamble receiver of claim 1, further comprising a preamble detector circuit configured to:
   determine a plurality of FFTs from a plurality of FFT windows; and
   non-coherently combine the determined FFTs into a combined received preamble signal.

4. The preamble receiver of claim 1, further comprising a preamble detector circuit configured to:
   determine a plurality of FFTs from a plurality of FFT windows; and
   coherently combine the determined FFTs into a combined received preamble signal.

5. The preamble receiver of claim 1, wherein the preamble sequence is used for any of: initial access, handover, request for scheduling, and resynchronization.

6. The preamble receiver of claim 1:
   wherein the preamble receiver is configured for beamforming;
   wherein beamforming weights are configured to change between FFT windows such that a number of spatial directions for which preamble detection is done is increased.

7. The preamble receiver of claim 6:
   wherein the preamble receiver comprises hardware support for more than one simultaneous analog beamforming configuration;
   wherein the preamble receiver is configured for switching at a first switching rate between spatial directions with one beamforming configuration, and for switching at a second switching rate between spatial directions with another beamforming configuration, the first rate being different from the second rate.

8. The preamble receiver of claim 6, wherein a single inverse FFT is applied per beam direction and polarization.

9. The preamble receiver of claim 6, wherein the preamble receiver is configured to perform simultaneous beam-forming and matched filtering by a comprised joint filter.

10. A method, performed in a preamble receiver, for receiving a radio signal and detecting a preamble sequence comprised in the radio signal, the method comprising:
   receiving a radio signal comprising a preamble signal constructed from a plurality of short sequences via at least one antenna element and radio unit, the short sequence having a same time duration as an Orthogonal Frequency-Division Multiplexing (OFDM) symbol used for carrying data traffic in a radio access network of the preamble transmitter;
   performing analog to digital conversion of the radio signal by an Analog-to-Digital Converter comprised in the preamble receiver;
   determining a Fast Fourier Transform (FFT) of the analog to digital converted signal, wherein a size of the FFT used for detecting the preamble signal is the same size as for detecting an OFDM symbol used for carrying data traffic in the radio access network;
   detecting the preamble sequence based on the determined FFT.

11. The method of claim 10, wherein the determining an FFT comprises determining an FFT using a single configuration for detecting OFDM symbols carrying data and for detecting preamble sequences.

12. The method of claim 10, wherein the detecting comprises:
   determining a plurality of FFTs from a plurality of FFT windows; and
   non-coherently combining the FFT results into a combined received preamble signal.

13. The method of claim 10, wherein the detecting comprises:
   determining a plurality of FFTs from a plurality of FFT windows; and coherently combining the FFT results into a combined received preamble signal.

14. A computer program product stored in a non-transitory computer readable medium for controlling a preamble receiver to receive a radio signal and detect a preamble sequence comprised in the radio signal, the computer program product comprising software instructions which, when run on processing circuitry of the preamble receiver, causes the preamble receiver to:
   receive a radio signal comprising a preamble signal constructed from a plurality of short sequences via at least one antenna element and radio unit, the short sequence having a same time duration as an Orthogonal Frequency-Division Multiplexing (OFDM) symbol used for carrying data traffic in a radio access network of the preamble transmitter;
   perform analog to digital conversion of the radio signal by an Analog-to-Digital Converter comprised in the preamble receiver;
   determine a Fast Fourier Transform (FFT) of the analog to digital converted signal, wherein a size of the FFT used for detecting the preamble signal is the same size as for detecting an OFDM symbol used for carrying data traffic in the radio access network;
   detect the preamble sequence based on the determined FFT.

* * * * *

UNITED STATES PATENT AND TRADEMARK OFFICE
CERTIFICATE OF CORRECTION

| | |
|---|---|
| PATENT NO. | : 10,201,018 B2 |
| APPLICATION NO. | : 15/125652 |
| DATED | : February 5, 2019 |
| INVENTOR(S) | : Sahlin et al. |

It is certified that error appears in the above-identified patent and that said Letters Patent is hereby corrected as shown below:

On the Title Page

In Item (87), under "PCT Pub. No.", in Column 1, Line 1, delete "WO2011/144256" and insert -- WO2015/144256 --, therefor.

In the Specification

In Column 16, Line 51, delete "Beam Forming" and insert -- Beam-Forming --, therefor.

Signed and Sealed this
Third Day of September, 2019

Andrei Iancu
*Director of the United States Patent and Trademark Office*